United States Patent
Kai et al.

[11] Patent Number: 5,828,909
[45] Date of Patent: Oct. 27, 1998

[54] DRIVING APPARATUS

[75] Inventors: Tadao Kai, Kawasaki; Hidenori Miyamoto, Urayasu, both of Japan

[73] Assignee: Nikon Corporation, Tokyo, Japan

[21] Appl. No.: 837,794

[22] Filed: Apr. 22, 1997

Related U.S. Application Data

[63] Continuation of Ser. No. 379,589, filed as PCT/JP94/00917 Jun. 7, 1994, abandoned.

[30] Foreign Application Priority Data

Jun. 7, 1993 [JP] Japan ................................. 5-136235

[51] Int. Cl.[6] ................................................... G03B 17/00
[52] U.S. Cl. .................................................................. 396/55
[58] Field of Search ................................... 396/52, 53, 54, 396/55

[56] References Cited

U.S. PATENT DOCUMENTS

| | | | |
|---|---|---|---|
| 4,623,930 | 11/1986 | Oshima et al. | 354/430 |
| 4,856,882 | 8/1989 | Oshima et al. | 350/500 |
| 5,020,890 | 6/1991 | Oshima et al. | 350/500 |
| 5,062,696 | 11/1991 | Oshima et al. | 354/430 |
| 5,084,724 | 1/1992 | Maeno | 354/430 |
| 5,153,633 | 10/1992 | Otani | 354/430 |
| 5,192,964 | 3/1993 | Shinohara et al. | 354/202 |
| 5,210,563 | 5/1993 | Hamada et al. | 354/400 |
| 5,266,988 | 11/1993 | Washisu | 534/70 |
| 5,398,132 | 3/1995 | Otani | 359/557 |
| 5,463,443 | 10/1995 | Tanaka et al. | 354/430 |

FOREIGN PATENT DOCUMENTS

| | | |
|---|---|---|
| 59-87513 | 5/1984 | Japan . |
| 2-296230 | 12/1990 | Japan . |
| 3-46642 | 2/1991 | Japan . |
| 3-138629 | 6/1991 | Japan . |
| 3-248139 | 11/1991 | Japan . |

*Primary Examiner*—Safet Metjahic
*Assistant Examiner*—Nicholas J. Tuccillo
*Attorney, Agent, or Firm*—Oliff & Berridge, PLC

[57] ABSTRACT

The driving apparatus for driving an object housed in a main body of the driving apparatus in a direction which is determined by a predetermined reference axis that includes a detector which detects a physical amount relating to a rotary motion of the main body around a predetermined detection axis; an arithmetic device )-which calculates a driving amount of the object based on at least the output of the detector and an angle between the detection axis and the reference axis; and a driving mechanism which drives the object in a direction determined with the reference axis based on a calculation output from the arithmetic device.

36 Claims, 19 Drawing Sheets

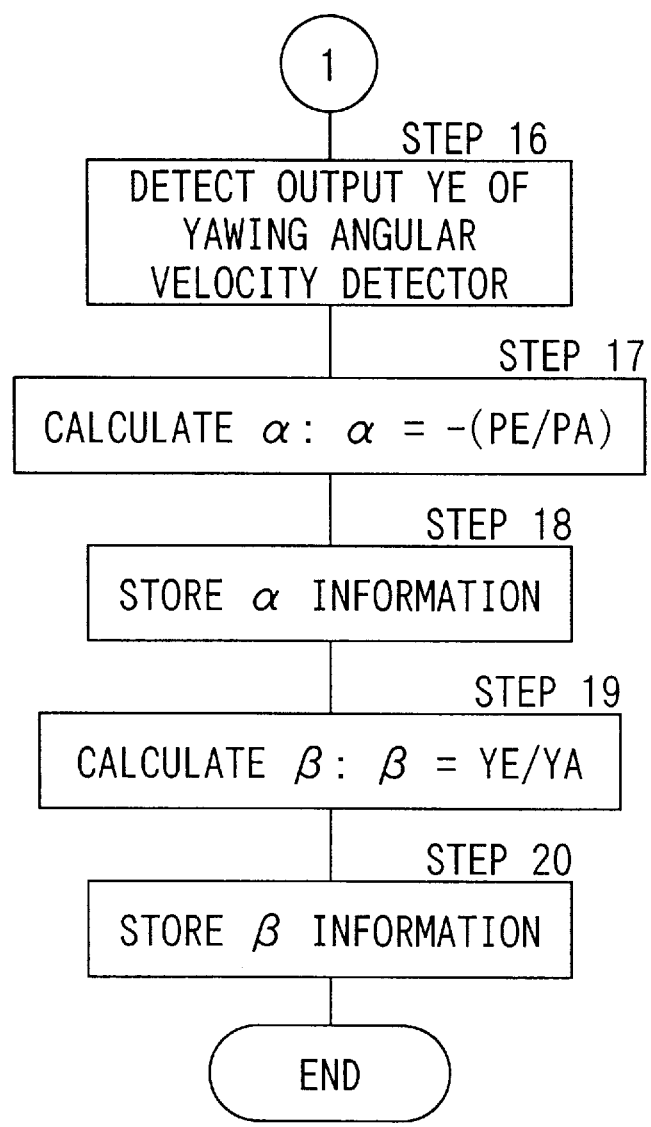

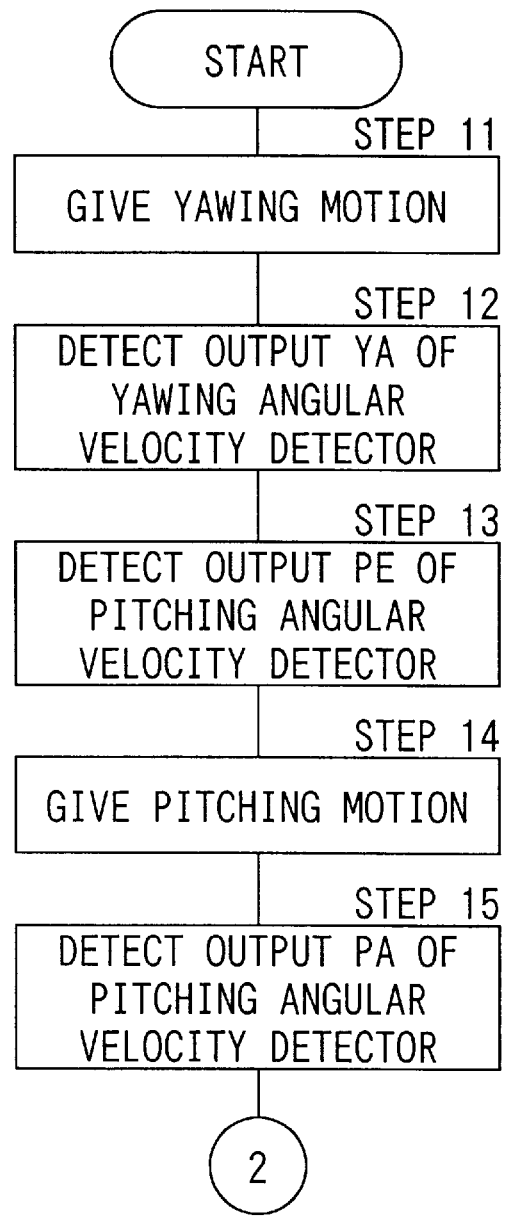

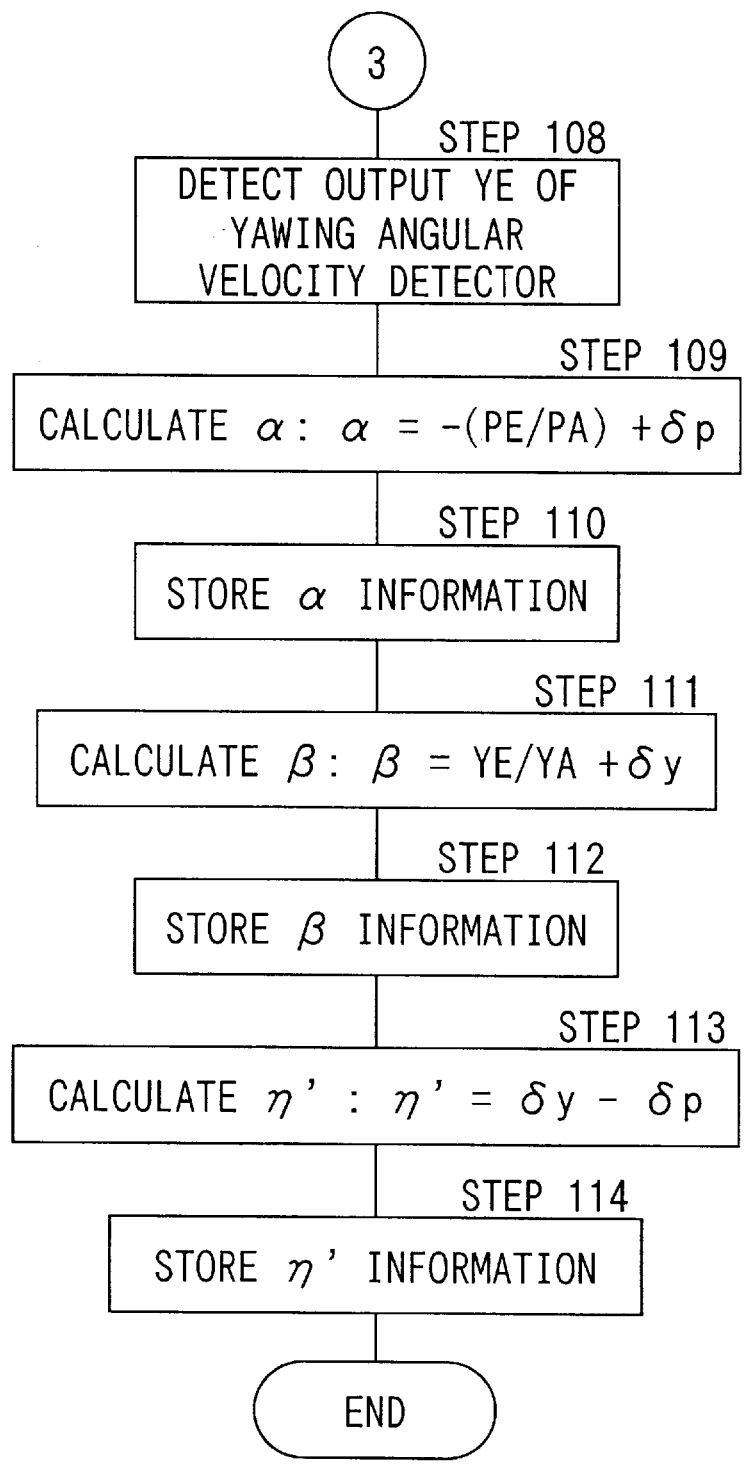

DRIVING APPARATUS

This is a continuation of application Ser. No. 08/379,589, filed as PCT/JP94/00917 Jun. 7, 1994, now abandoned.

BACKGROUND OF THE INVENTION

1. Field of the Invention

The present invention relates to a driving apparatus such as an image vibration prevention apparatus of a camera, particularly to a driving apparatus which drives an object to be driven such as a compensation optical system based on an output of a rotary motion detector.

2. Description of the Related Art

Recently, various kinds of image vibration prevention apparatuses have been proposed in which vibration of a photographic image caused by camera vibration by hand tremble or the like are optically prevented. A camera which is equipped with such an image vibration prevention apparatus comprises a detector which detects a camera vibration amount and prevents image vibration by driving an optical system for image vibration compensation (a compensation optical system) in a direction perpendicular to the optical axis based on the output of the detector. In Japanese Laid-open Patent Application No. 1-291165, disclosed is a vibration prevention apparatus which comprises pairs of acceleration detectors for both yawing and pitching directions which detect amounts of camera vibration in a pitching direction Dp and in a yawing direction Dy shown in FIG. 5, respectively, and drives a compensation optical system horizontally and vertically, respectively, based on an output of each acceleration detector. In this application, an example which utilizes an angular velocity detector instead of the acceleration detector is also disclosed.

It is important to detect an accurate amount of camera vibration in order to remove the image vibration efficiently by driving a compensation optical system accurately. In the above-mentioned application, disclosed are a method to eliminate a disadvantageous influence due to the gravitational acceleration inherent in an acceleration detector and a method to adjust a rotating position of the angular acceleration detectors in each pitching direction and yawing direction integrally.

It is expected that an angular velocity detector will be much used as a detector element to detect camera vibration in the future, because a vibrating type angular velocity detector is being developed rapidly in recent years. The angular velocity detector is a detector to detect a rotary angular velocity around a predetermined detection axis. Consequently, in case that a camera is equipped with an angular velocity detector to detect a vibration in the pitching direction (hereinafter termed a pitching angular velocity detector) and an angular velocity detector to detect a vibration in the yawing direction (hereinafter termed a yawing angular velocity detector), it is possible to detect a pitching vibration and a yawing vibration of a camera. The pitching vibration is normally a rotary motion in a vertical direction around a horizontal axis TP (called a true pitching axis) extending in a lateral direction of a camera as shown in FIG. 15. The yawing vibration is a rotary motion in a horizontal direction around a vertical axis TY (called a true yawing axis). Both axes TP and TY are perpendicular to an optical axis L of the photographic lens, and also perpendicular to each other.

In this description, a detection axis of a pitching angular velocity detector is termed a pitching detection axis and a detection axis of a yawing angular velocity detector is termed a yawing detection axis. In other words, the pitching angular velocity detector detects an amount of rotary motion of a camera around the pitching detection axis and the yawing angular velocity detector detects an amount of rotary motion of a camera around the yawing detection axis. A driving direction of a compensation optical system based on the output of the pitching angular velocity detector (normally in an upward-downward direction of a camera) is termed a pitching driving direction and a driving direction of a compensation optical system based on the output of a yawing angular velocity detector (normally in a lateral direction of a camera) is termed a yawing driving direction. Further, a reference axis in driving the compensation optical system in the pitching driving direction (which is perpendicular to the pitching driving direction) is termed a pitching compensation axis and a reference axis in driving the compensation optical system in the yawing driving direction (which is perpendicular to the yawing driving direction) is termed a yawing compensation axis. Directions of the pitching compensation axis and the yawing compensation axis depend on an attitude of a compensation optical system driving section attached to a barrel or an assembly state of the driving section itself. And also the pitching driving direction and the yawing driving direction depend on directions of the pitching compensation axis and the yawing compensation axis.

However, for example, in an angular velocity detector which is disclosed in Japanese Laid-open Patent Application No. 2-228518, since its vibrating element to determine a direction of a detection axis is supported in the vacancy by wire-shaped support member and the support member is attached to a main body case, the direction of the detection axis against the main body case is inconstant among each velocity detector. Consequently, if an attitude of each angular velocity detector is not adjusted accurately to align the detection axis in the proper direction when the angular velocity detector is installed in a camera, there is a possibility that, for example, an output of a pitching angular velocity detector may include components of a yawing vibration and an output of a yawing angular velocity detector may include components of a pitching vibration. In this case, if the output of each angular velocity detector is used as it is, a proper driving amount of a compensation optical system is not obtained and an accurate vibration compensation can not be performed.

And also, even if the attitude of the angular velocity detector has been adjusted accurately, the above-mentioned pitching compensation axis and yawing compensation axis do not always coincide with the pitching detection axis and the yawing detection axis, respectively, due to an positioning error in installing a compensation optical system driving section on a barrel and a poor accuracy of assembling of the driving section itself. If they do not coincide with each other, and the output of each angular velocity is used as it is in the same way as mentioned above, the accurate vibration compensation can not be performed.

In the apparatus disclosed in the above-mentioned Japanese Laid-open Patent Application No. 1-291165, only adjusting the rotating position in the pitching direction and the yawing direction is performed integrally after the two angular velocity detectors are mounted on one part, and also no disclosure is made that the attitude of each angular velocity detector or the position of the compensation optical system driving section is adjusted. Consequently, there is a possibility that the camera vibration is not detected accurately due to the above-noted reason.

There may be a proposal of an adjusting operation in which an accuracy in an installation of each angular velocity detector and an accuracy in a driving direction of the compensation optical system driving section correspond to each other with respect to the fixed barrel part of the barrel, in order that the output of the pitching angular velocity detector does not include components of the yawing vibration, the yawing angular velocity detector does not include components of the pitching vibration, the yawing detection axis coincides with the yawing compensation axis, and the pitching detection axis coincides with the pitching compensation axis. However, this adjusting operation is very troublesome and it costs very highly. Even if the above-mentioned operation is performed, the accurate vibration compensation can not be performed in case that the direction of compensating yawing and the direction of compensating pitching do not have characteristics of right angle.

SUMMARY OF THE INVENTION

The object of the present invention is to provide a driving apparatus which can control a driving amount for driving an object to be driven with a minimum adjusting operation to be proper amount.

In order to attain this object, a driving apparatus according to the present invention, comprising: a detector which detects a physical amount relating to a rotary motion of an object to be detected around a predetermined detection axis; an arithmetic means to calculate a driving amount of an object to be driven provided on the object to be detected based on at least an output of the detector and an angle between the detection axis and a reference axis which determines a driving direction of the object to be driven; and a driving means which drives the object to be driven based on a calculated result of the arithmetic means in a direction determined with the reference axis.

The arithmetic means calculates the driving amount of the object to be driven provided on the object to be detected based on at least the output of the detector and the angle between the detection axis and the reference axis which determines the driving direction of the object to be driven. The driving means drives the object to be driven based on the calculated result of the arithmetic means in the direction determined with the reference axis. In this manner, according to the present invention, since the driving amount of the object to be driven is calculated considering the angle between the detection axis of the detector and the reference axis, the object to be driven can be driven with the accurate driving amount even if the relationship between the direction of the detection axis and the direction of the compensation axis is not ideal. Consequently, the accurate adjusting of the position of the detecting system is not needed, and the reduction of man-hour and the reduction of cost are expected.

BRIEF DESCRIPTION OF THE DRAWINGS

FIG. 8A and FIG. 8B are figures which show procedures of calculating coefficients to calculate a reduced driving amount.

FIG. 9A and FIG. 9B are figures in the same manner as FIG. 8A and FIG. 8B.

FIG. 10A and FIG. 10B are figures in the same manner as FIG. 8A and FIG. 8B.

DETAILED DESCRIPTION OF THE PREFERRED EMBODIMENTS

An embodiment according to the present invention which applies to an image vibration prevention apparatus will be explained with reference to FIGS. 1 through 13.

Figure 1:
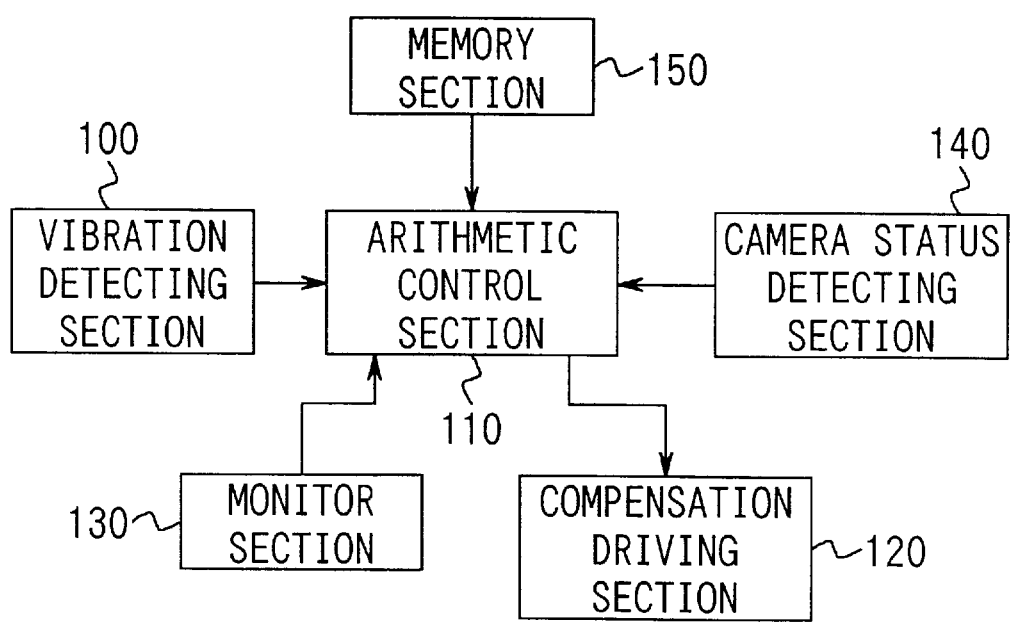
FIG. 1 is a block diagram which shows an image vibration prevention apparatus of a camera according to an embodiment of the present invention.

FIG. 1 is a block diagram which shows the whole configuration of an image vibration prevention apparatus (a driving apparatus).

Figure 2:
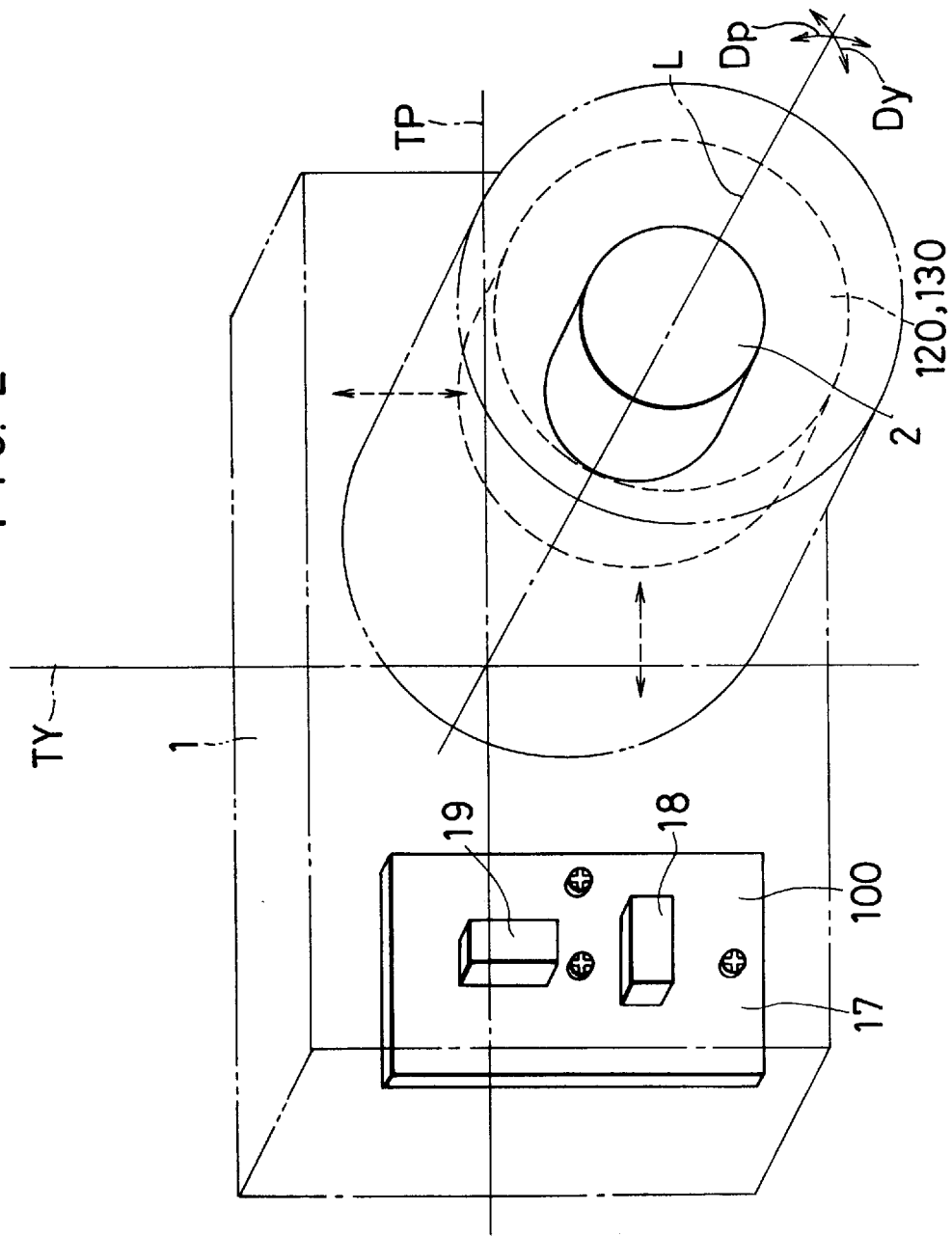
FIG. 2 is a perspective view of a camera equipped with the above-mentioned image vibration prevention apparatus.

The reference numeral 100 denotes a vibration detecting section which comprises a vibration type pitching angular velocity detector 18 and a vibration type yawing angular velocity detector 19. The detection output thereof is input to an arithmetic control section 110. The reference numeral 130 denotes a monitor section which detects a driving amount of an compensation optical system 2 which is shown in FIG. 2 and inputs the detected driving amount to the arithmetic control section 110. The reference numeral 140 denotes a camera status detecting section. The camera status detecting section 140 detects various kinds of information such as, for example, a focal length of a photographic lens, a camera-to-subject distance, or a selected status of exposure mode through various kinds of switches and encoder, and inputs the detected information to the arithmetic control section 110. Various kinds of coefficients which are used in a calculation of the arithmetic control section 110 are previously stored in a memory section 150, and these kinds of information are input to the arithmetic control section 110 properly. The reference numeral 120 denotes a compensation driving section to drive the compensation optical system 2.

The arithmetic control section 110 calculates a reduced driving amount (which will be explained later in detail) of the compensation optical system 2 to compensate vibration based on input information from the vibration detecting section 100, the monitor section 130, the camera status detecting section 140, and the memory section 150. And the compensation driving section 120 drives the compensation optical system 2 in the proper amount based on the calculated result.

Figure 3:
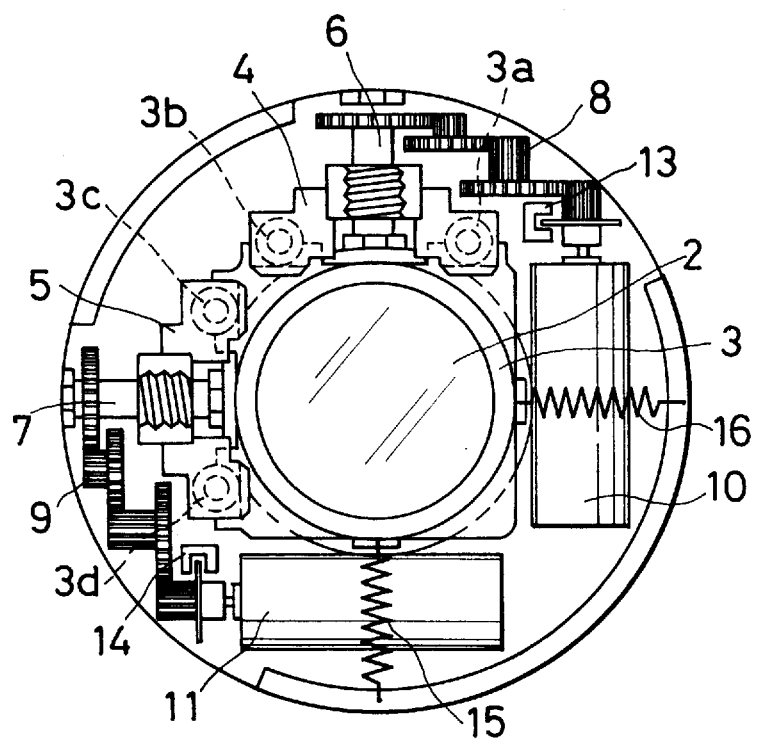
FIG. 3 is a detailed figure which shows a compensation driving section and a monitor section which compose an image vibration prevention apparatus.

FIG. 3 is a figure which shows a configuration of the compensation driving section 120 and the monitor section 130. The reference numeral 3 denotes a lens room where the compensation optical system 2 is housed. The lens room is installed in such a manner that it moves in a plane perpendicular to an optical axis and it does not move in the optical axis direction. A driving board for pitching compensation 4 and a driving board for yawing compensation 5 are coupled to this lens room 3 with pins 3a through 3d, respectively. A movement of the driving board for pitching compensation 4 in an upward-downward direction of a camera and a movement of the driving board for yawing compensation 5 in a lateral direction of a camera cause the lens room 3 to be driven in any direction upwardly-downwardly and laterally in a plane perpendicular to an optical axis L of a photographic optical system. In this manner the compensation optical system 2 is operated to prevent the image vibration.

The reference numeral 10 denotes a pitching driving motor to drive the driving board for pitching compensation. The rotation thereof is transmitted to a pitching driving screw 6 through a pitching gear train 8, and the rotation of the screw 6 drives the driving board of pitching compensation 4. The reference numeral 11 denotes a yawing driving motor, the rotation of which is transmitted to a yawing driving screw 7 through a yawing gear train 9, and the rotation of the screw 7 drives the driving board of yawing compensation 5. The pitching driving motor 10 and the yawing driving motor 11 are driven by a driving signal from the arithmetic control section 110 through a motor driver which is not shown in the Figures. The reference numeral 15 and 16 denote a pitching spring and a yawing spring which are installed between the barrel which composes a part of a camera body (shown in FIG. 2) and the lens room 3. These springs 15 and 16 prevent the driving board for pitching compensation 4 and the driving board for yawing compensation 5 from detaching from the lens room 3.

In FIG. 3, the reference numeral 13 and 14 denote a pitching interrupter and a yawing interrupter (of which the monitor section 130 is comprised) which detect driving amounts of the pitching driving motor 10 and the yawing driving motor 11, in other words driving amounts of the compensation optical system 2, respectively. Each output of the interrupters 13 and 14 is input to the arithmetic control section 100 through a monitor signal generation circuit not shown in the figures.

The reference numeral 17 in FIG. 2 denotes a board which is installed in a camera body 1. The pitching angular velocity detector 18 and the yawing angular velocity detector 19 are secured to this board 17 as shown in enlarged figures FIG. 4 and 5. A circuit which gets each output from angular velocity detectors 18 and 19 is formed on the board 17. The pitching angular velocity detector 18 is a detector to detect an angular velocity (in the direction Dp) around a true pitching axis TP which is extending in the direction perpendicular to the optical axis L of the photographic optical system and in the lateral direction of a camera. The yawing angular velocity detector 19 is a detector to detect an angular velocity (in the direction Dy) around a true yawing axis TY extending in the direction perpendicular to the optical axis L and in the upward-downward direction of a camera.

Figure 4:
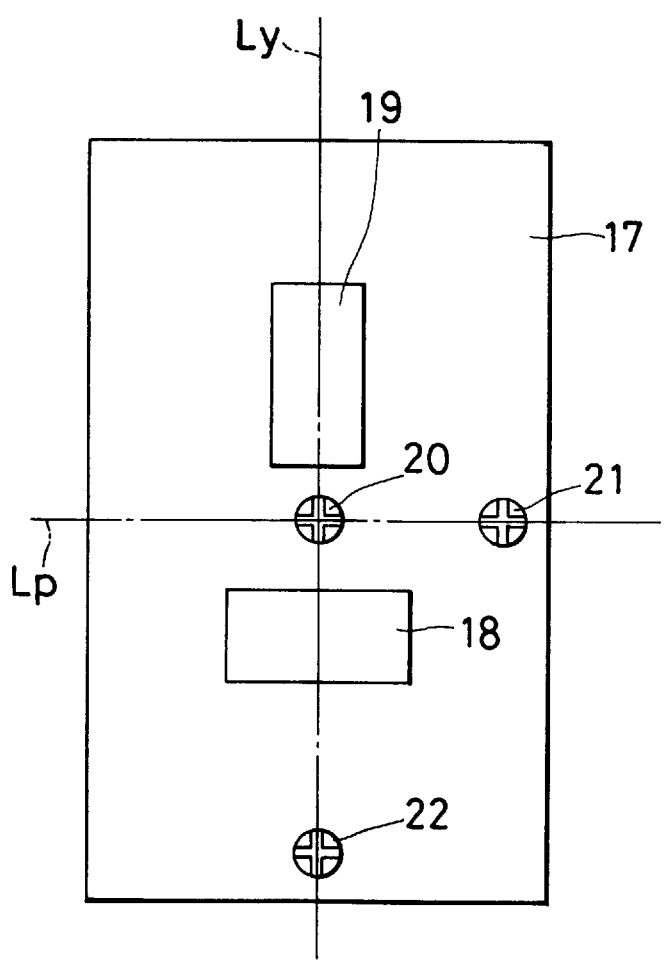
FIG. 4 is a front view which shows a configuration of a vibration detecting section.
Figure 5:
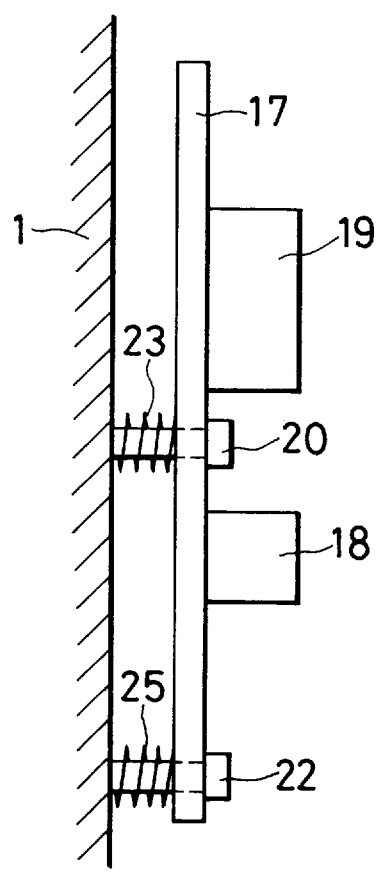
FIG. 5 is a left side view of FIG. 4.

The board 17 is installed on the camera body 1 with a center screw 20, a pitching adjustment screw 21, and a yawing adjustment screw 22 as shown in FIGS. 4 and 5, and is always urged forward from the camera body by adjusting springs 23 through 25 (24 is not shown in the Figures). The center screw 20 is arranged substantially in the center of the board 17, and the pitching adjustment screw 21 is arranged at the position away from the center screw 20 by a certain distance in a direction of an axis Lp (which is parallel to the true pitching axis TP). And also the yawing adjustment screw 22 is arranged away from the above-mentioned center screw 20 by a certain distance in a direction of an axis Ly (which is parallel to the true yawing axis TY). In other words, the pitching adjustment screw 21, the center screw 20, the yawing adjustment screw 22 are arranged so that a right-angled triangle is formed and the center screw 20 is located at the right-angled vertex. Adjusting the pitching adjustment screw 21 and the yawing adjustment screw 22 perform an attitude adjustment operation to remove an inclination of each detection axis (a pitching detection axis and a yawing detection axis) of angular velocity detectors 18 and 19 to the optical axis as explained later.

The reason to perform the attitude adjustment operation to remove the inclination with respect to the optical axis will be explained in the following.

A vibration (a rolling vibration) in a rotating direction around the optical axis L also happens on a camera generally in addition to the above-mentioned pitching vibration and yawing vibration. If the attitude adjustment of the angular detectors is not performed, the outputs of the pitching angular velocity detector and the yawing angular detector may include components of the rolling vibration. As a result, there is a possibility that the accurate detection of the camera vibration is not performed.

The following will explain to what extent the influence by the rolling vibration causes a problem.

Now, consideration is made on a rotary motion around a central axis of rotation. It is also assumed that a rotary velocity of this rotary motion is expressed by R, and an angle between a detection axis of an angular velocity detector to detect a rotary angular velocity and the above-mentioned central axis of rotation is expected by $\gamma$ (deg). Now the output Vr of the angular velocity detector is expressed as:

$$Vr = A \times R \times cos(\gamma) \quad (1)$$

(where A is a gain constant.)

Since $\gamma=0$ degree is detected when the detection axis of the angular velocity detector completely coincides with the central axis of rotation, $cos(\gamma)=1$ is obtained, and then $Vr=A \times R$ is obtained. $\gamma=90$ degrees causes $Vr=0$.

Figure 13:
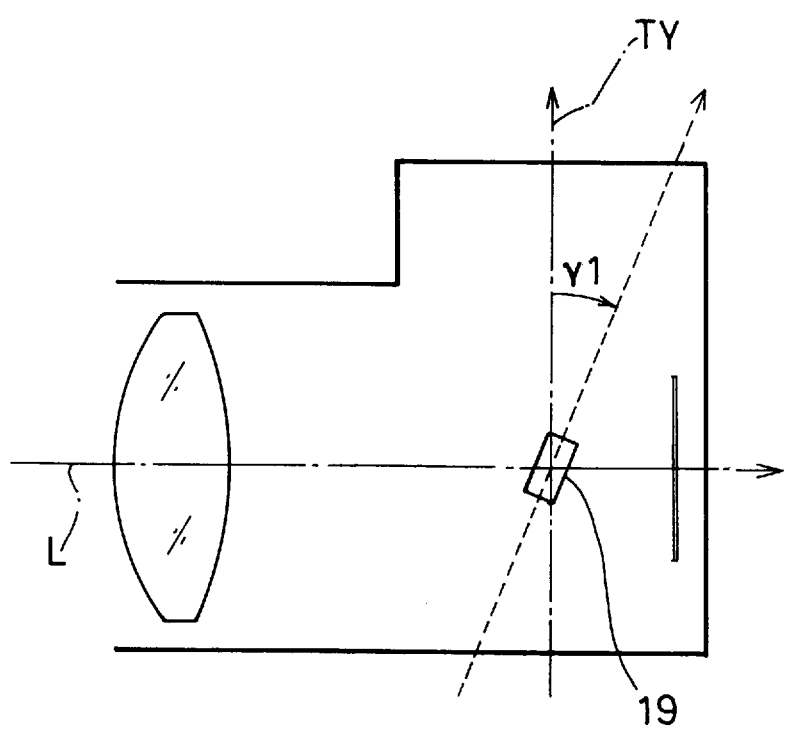
FIG. 13 is a figure which explains a problem for vibration around an optical axis.

For example, assuming that the detection axis of the yawing angular velocity detector 19 inclines from a plane perpendicular to the photographic optical axis L, in other words from the regular rotational central axis TY, to the optical axis L with $\gamma$ degree (which is a vary small value compared with 90 degrees, but is not 0 degree) as shown in FIG. 13. If the camera rotates around the axis TY in this condition, the output Vr of the yawing angular velocity detector 19 can be nearly regarded as $Vr=A \times R$, because the output Vr of the yawing angular velocity detector 19 is expressed as the expression (1) and $cos(\gamma)=1$ can be assumed even if the $\gamma$ becomes large. In other words, the inclination of the yawing vibration detection axis to the optical axis does not influence the accuracy of the yawing detection so much.

Meanwhile, the output of the yawing angular velocity 19 relating to a rotation around a rolling rotational axis (the optical axis L), or to the rolling vibration, is expressed as:

$$Vr = A \times R \times cos(90° - \gamma) = Vr \times sin(\gamma) \quad (2)$$

Consequently, the components of the rolling vibration which is included in the output of the yawing vibration detector 19 and considered the error rapidly increases as the $\gamma$ increases. For example, $\gamma=3$ degrees causes $A \times R \times 5.2\%$, and $\gamma=5$ degrees causes A×R×8.7%. In other words, even if the yawing detection axis inclines by a very little from the regular rotational central axis TY to the optical axis L, the components of the rolling vibration which must not output, is included in the output of the angular velocity detector for yawing vibration detection in the comparatively big proportion. As a result the accurate detection result can not be obtained. In the same manner, even if the pitching detection axis inclines by a very little from the regular rotational central axis to the optical axis L, the components of the rolling vibration is included in the output of the angular velocity detector for pitching detection 18 in the comparatively big proportion. Consequently, at least the attitude adjustment operation must be done in order that these kinds of components of the rolling vibration are not included in each output of the angular velocity detectors 18 and 19.

Figure 6:
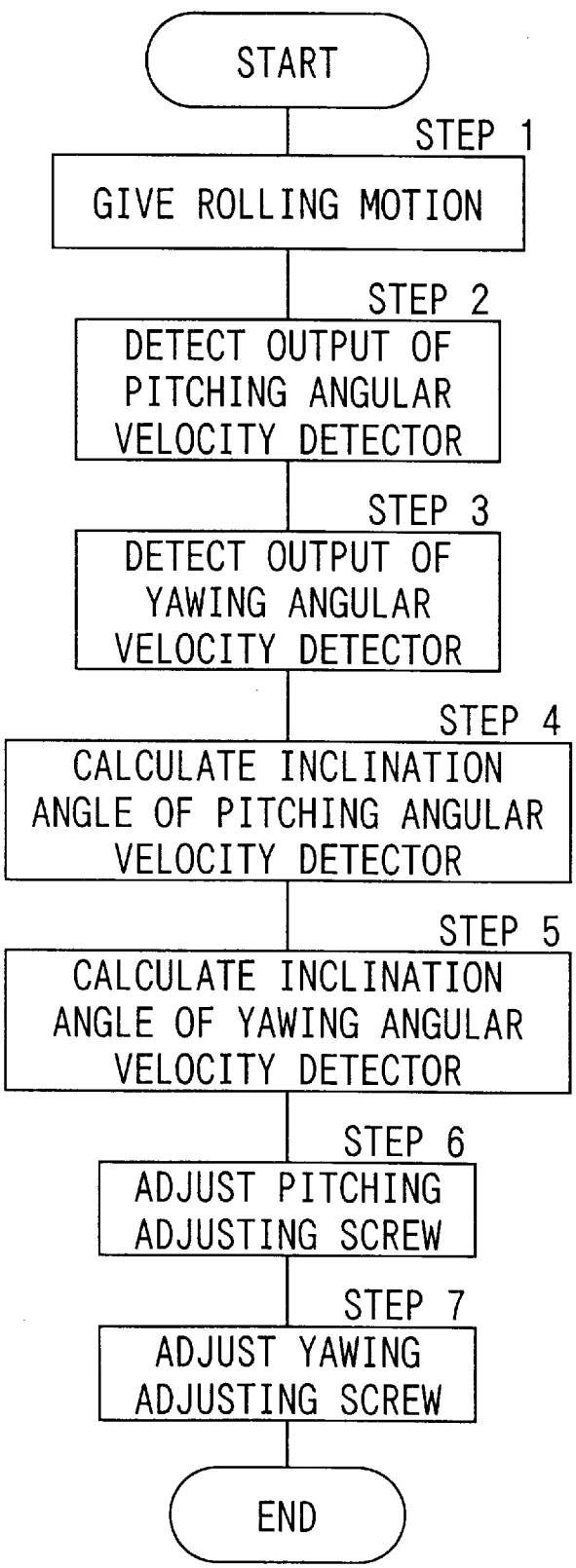
FIG. 6 is a figure which shows an attitude adjusting procedure in order not to include components of a rolling vibration in an output of an angular velocity detector.

FIG. 6 shows a procedure in order that the above-mentioned components of the rolling vibration are not included in each output of the angular detectors 18 and 19.

At the step 1, a predetermined rolling motion is given to a camera first. The rolling motion is a rotary motion around the optical axis L of the photographic optical system as mentioned above. At this time, since each detection axis of each angular velocity detectors 18 and 19 has not been adjusted yet, each of the pitching angular velocity detector 18 and the yawing angular velocity detector 19 outputs the output Vr (refer to the expression (2)) caused by the rolling motion according to each inclination angle of the detection axis to the optical axis L.

At the step 2, the output Vr of the pitching angular velocity detector 18 is retrieved, and at the step 3, the output Vr of the yawing angular velocity detector 19 is retrieved. At the step 4, the inclination angle which corresponds to the $\gamma$ of the expression (2) is calculated based on the output Vr of the pitching angular velocity detector 18 obtained at the step 2, and at the step 5, the inclination angle $\gamma$ is calculated based on the output Vr of the yawing angular velocity detector 19 obtained at the step 3 in the same way.

After each inclination angle of the angular velocity detectors 18 and 19 is determined, the adjustment operation to remove each inclination of detection axes is performed. That is, at the step 6, the pitching adjustment screw 21 is tighten or loosened. Adjusting this screw 21 makes the board 17 rock around the axis Ly shown in FIG. 4 in a direction of back and front of the camera, and the angle of the pitching angular velocity detector 18 accordingly changes. Consequently, the pitching detection axis is displaced in the direction which is parallel to the plane (the first plane) perpendicular to the optical axis L. Adjusting the screw 21 with an amount corresponding to an amount to remove the inclination of the pitching detection axis calculated at the step 4 makes the pitching detection axis parallel to the first plane.

Adjusting the pitching adjustment screw 21 does not make the board 17 incline to the true yawing axis TY, and the angle between the yawing detection axis and the first plane does not change.

Since the axis Ly in FIG. 4 runs at the center of the board 17, the rocking amount of the board 17 is divided to right and left, and then the moving amount in a direction of rear and front of the camera at the right and left edges of the board 17 can be minimized. Consequently, even if the camera body 1 does not have enough room of the space surrounding the board 17, the attitude adjustment operation with the pitching adjustment screw 21 can be performed. And since each of the pitching angular velocity detector 18 and the yawing angular velocity detector 19 is arranged substantially symmetrically to either side of the axis Ly, the rocking amount of both angular velocity detectors 18 and 19 by adjusting the pitching adjustment screw 21 can be minimized and also the lateral width of the board 17 can be narrowed. This also makes the space surrounding the board small.

At the step 7, the yawing adjustment screw 22 is tighten or loosened with an amount corresponding to an amount to remove the inclination of the detection axis of the yawing angular velocity detector 19 calculated at the step 5. Adjusting this screw 22 makes the board 17 rock around the axis Lp in the direction of back and front of the camera, and the angle of the yawing angular velocity detector 19 accordingly changes. Consequently, the yawing detection axis can be paralleled to the above-mentioned first plane. The adjusting the yawing adjustment screw 22 does not make the board 17 incline with reference to the true pitching axis TP, and therefore the angle between the pitching detection axis and the first plane may not change.

Since the heights of the board 17 is bigger than the width of the board 17, the moving amount in the direction of the back and front of the camera at the upper and lower edges of the board 17 when the yawing angular velocity detector 19 is adjusted with the screw 22 is a little bigger than the moving amount when the pitching angular velocity detector 18 is adjusted. However, since the axis Lp runs at the center of the board 17, the rocking amount of the board 17 is divided to upper and lower, and then the moving amount at the upper and lower edge of the board 17 can be minimized. And if comparatively physically low electrical components except for angular velocity detectors are arranged at the upper edge and the lower edge of the board 17, the space for the adjusting can become a little big. In this embodiment, the comparatively physically high pitching angular velocity detector 18 and yawing angular velocity detector 19 are arranged at the center side of the board. This also can makes the room of the space at the upper, lower, right, and left edges of the board 17 comparatively big.

According to the above-mentioned expression (2), if the inclination angle of each detection axis to the optical axis is ±3 degrees or less, an error which is included in each of outputs of the angular velocity detectors 18 and 19 can be suppressed at 5% or less. Since the image vibration prevention apparatus of a camera as described in this embodiment needs to keep the error at 5% or less, it is to be desired that the attitude adjustment operation of the angular velocity detectors is performed so that the above-mentioned inclination angle is ±3 degrees or less.

In apparatuses to which this invention applies, some can get a sufficient performance even if the inclination angle is, for example, 5 degrees, but others can not get a sufficient performance even if the inclination angle is 1 degree or less. Consequently, the target value of the angle adjustment operation varies from apparatus to apparatus.

Each of the pitching detection axis and the yawing detection axis is approximately paralleled to the first plane perpendicular to the optical axis L through the procedures in FIG. 6 as described above. Consequently, the $\gamma$ of the expression (2) becomes almost 0, and the components of rolling motion which is added to a camera are not included in the both outputs of the angular velocity detectors 18 and 19.

In addition, the step 4 and the steps after the step 4 can be processed while the rolling motion is being added continuously, or only the step 2 and the step 3 are processed during the rolling motion, and the step 4 and the steps after that can be processed after the rolling motion is stopped. Or the above-mentioned steps can be repeated until the required accuracy is obtained, in other words until each output of the angular velocity detectors 18 and 19 becomes almost 0 during the rolling motion.

After the adjustment operation is completed, each adjusting pin and screw is locked by an adhesive or the like, so that the reliability against a change with the passage of time or the like is improved. If it is guaranteed that the inclination angle of each detection axis to the optical axis is within the allowable range when each of the detector 18 and 19 is mounted on the board 17, the board 17 can be fixed directly on a predetermined position of the camera body 1 without the above-mentioned adjustment with each screw.

An alternating rotary motion in which a camera rotates alternately in both directions is better than a rotary motion in a single direction for the rolling motion given to a camera at the step 1. Because, when an output of an angular velocity detector is detected, a high-pass filter is often used to remove a drift or the like on zero output, and if the rotary motion in a single direction keeps on being given, it is difficult to get an accurate output.

The above-mentioned attitude adjustment operation adjusts the inclinations of the pitching detection axis and the yawing detection axis in the direction of the optical axis, and then it becomes possible to remove the components of rolling vibration from each output of the angular detectors 18 and 19. However, it is not guaranteed that the pitching detection axis and the yawing detection axis coincide with the pitching compensation axis (the pitching reference axis) and the yawing compensation axis (the yawing reference axis) of the compensation optical system 2, respectively, because the rotational angle adjustment is not performed in the plane (the first plane perpendicular to the optical axis L) in parallel to a plane on which the angular velocity detectors 18 and 19 is disposed. The pitching compensation axis and the yawing compensation axis are axes (both axes lie in the direction perpendicular to the pitching and yawing driving directions) to be referenced when the compensation optical system 2 is driven in the pitching driving direction and in the yawing driving direction, respectively, as described above. Consequently, if the pitching detection axis and the yawing detection axis do not coincide with these axes and the compensation optical system 2 is driven based on the outputs of the pitching angular velocity detector 18 and the yawing angular velocity detector 19 as they are, there is a possibility that the vibration compensation is not be performed accurately. In particular, when the angular velocity detectors are soldered on the board 17 perpendicular to the optical axis L, it is difficult to suppress a variation of the direction of an individual detection axis in the plane which is perpendicular to the optical axis L.

Both the pitching compensation axis and the yawing compensation axis are perpendicular to the rolling rotational axis L, and as a result of the above-mentioned attitude adjustment the pitching detection axis and the yawing detection axis are also perpendicular to the rolling rotational axis L. In other words, the relation between both the compensation axes and both the detection axes mentioned above is considered as a relation in a two-dimensional plane. Consequently, each of outputs of the pitching angular velocity detector 18 and the yawing angular velocity detector 19 is compensated based on an angle between the pitching detection axis and the pitching compensation axis, and an angle between the yawing detection axis and the yawing compensation axis, so that the reduced driving amount to perform the very accurate prevention of vibration can be obtained.

The above-mentioned reduced driving amount is a physical amount expressed by a driving amount with an output level of an angular velocity detector in case of driving the compensation optical system 2 to prevent the image vibration. Consequently, the output of the yawing angular velocity detector itself corresponds to the reduced driving amount for the yawing compensation and the output of the pitching angular velocity detector itself corresponds to the reduced driving amount for the pitching compensation in an ideal condition where the pitching detection axis and the yawing detection axis coincide with the pitching compensation axis and the yawing compensation axis, respectively, and the yawing compensation axis and the pitching compensation axis are accurately perpendicular to each other. However, as mentioned above, the both detection axes do not always coincide with the both compensation axes, and also it is not guaranteed that the yawing compensation axis and the pitching compensation axis are perpendicular to each other. Therefore, it is needed that the reduced driving amount is obtained through arithmetic calculation.

Figure 7:
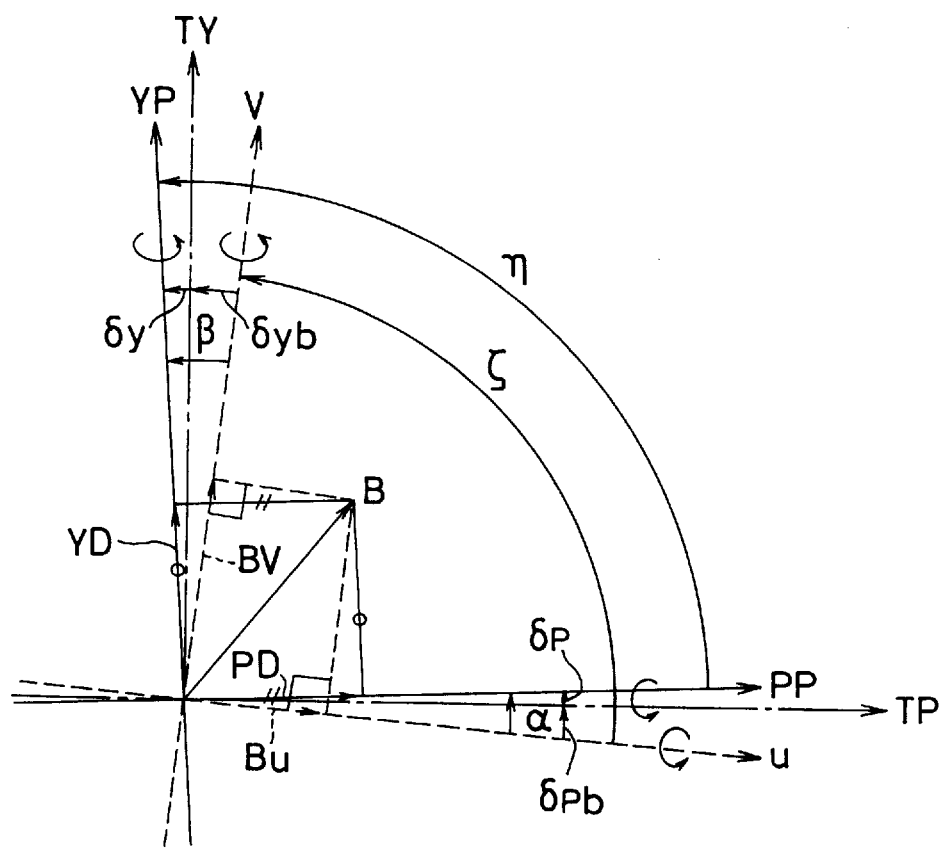
FIG. 7 is a figure which shows a coordinate system in calculating a reduced driving amount of a compensation optical system.

FIG. 7 is a figure which shows a relation between the pitching detection axis u and the yawing detection axis V, and a relation between the pitching compensation axis PP and the yawing compensation axis YP viewing from a rear side of a camera. The TY denotes the true yawing axis with regard to the camera body 1 and the TP denotes the true pitching axis. The example in FIG. 7 shows that the pitching detection axis u, the pitching compensation axis PP and the true pitching axis TP do not coincide with each other, and the yawing detection axis V, the yawing compensation axis YP and the true yawing axis TY also do not coincide with each other.

It is assumed that respective positive vectors of the axis u, V, PP and YP represent right-handed rotations around the axes, and a magnitude of the each vector represents a rotating amount per unit time (=an angular velocity). And it is assumed that the angle between the pitching detection axis U and the pitching compensation axis PP is $\alpha$, the angle between the yawing detection axis V and the yawing compensation axis YP is $\beta$, the angle between the pitching detection axis u and the yawing detection axis V is $\zeta$, and the angle between the pitching compensation PP and the yawing compensation axis YP is $\eta$. The $\alpha$, $\beta$, $\zeta$ and $\eta$ (these unit is radian) are angles which are fixed on a structure of the camera body, and relations between them fixed at manufacturing will not change after that.

Now assuming that the vector B represents a camera vibration composed of a pitching motion and a yawing motion, the vector B can be decomposed into the vector Bu and the vector BV in directions of the pitching detection axis u and the yawing detection axis V. These vectors Bu and BV correspond to the detection outputs of the pitching angular detector 18 and the yawing angular detector 19 with regard to the vector B. In the same manner, the vector B can be decomposed into the vectors PD and YD in directions of the pitching compensation axis PP and the yawing compensation axis YP. These vectors PD and YD correspond to the reduced driving amount for the pitching compensation and the yawing compensation to be obtained.

The vectors Bu and BV are signal outputs in proportion to the cosine in directions of the axes as explained on the expression (1). On the other hand, the vectors PD and YD are vectors composing a parallelogram. But since the vector PD is normally perpendicular to the vector YD, they can be expressed as vectors composing a rectangular or a square. And the vectors PD and YD can be obtained from the vectors Bu and BV through following expressions.

$$YD = \frac{BV}{\cos\beta} - (A1 \times A2), \quad (3)$$

where $$A1 = \frac{Bu - (BV \times \cos\zeta)}{\sin\zeta} + (BV \times \tan\beta)$$

$$A2 = \{\sin\beta + (\cos\beta \times \cot\eta)\}$$

$$PD = \frac{Bu}{\cos\alpha} + (A3 \times A4), \quad (4)$$

where $$A3 = \frac{BV - (Bu \times \cos\zeta)}{\sin\zeta} - (Bu \times \tan\alpha)$$

$$A4 = \{\sin\alpha - (\cos\alpha \times \cot\eta)\}$$

In addition, since $\zeta=\eta+\alpha-\beta$ is obtained as is evident from FIG. 7, the number of kinds of angle variable can be reduced to three. And also the following simplified calculation method can be adopted in case of certain values of the $\alpha$, $\beta$, $\zeta$ and $\eta$ which are used in the above-mentioned expression.

Since each direction of the axes is determined in order that the pitching detection axis u coincides with the pitching compensation axis PP and the yawing detection axis V coincides with the yawing compensation axis YP, it can be assumed that the $\alpha$ and $\beta$ are around 0 (radian). Since a value of trigonometric cosine changes little even if the angle changes a little around 0 (radian), $\cos(\alpha$ or $\beta)=1$ can be assumed. And also $\sin(\alpha$ or $\beta)=\alpha$ or $\beta$ can be assumed approximately. In the same way, since the ( is the angle around $\pi/2$ (radian) and the value of the sine changes little even if the angle changes a little around $\pi/2$ (radian), $\sin\zeta=1$ can be assumed. And also $\cos\zeta\times\sin(\alpha$ or $\beta)$ may be replaced by 0 and $\tan(\beta$ or $\alpha)\times\sin(\beta$ or $\alpha)$ may be replaced by 0, and since the $\eta$ is almost $\pi/2$(radian), $\sin\eta$ may be replaced by 1 and $\cot\eta$ may be replaced by $\cos\eta$. The following expressions are obtained based on the above mentioned simplification.

$$YD'=BV-\{Bu\times(\beta+\cos\eta)\}$$

$$PD'=Bu+\{BV\times(\alpha-\cos\eta)\}$$

Or when $\eta=\pi/2$(radian)$+\eta'$ is assumed, the following expressions can be obtained by changing to sine function with the $\eta'$. Since the $\eta$ is almost $\pi/2$(radian), the $\eta'$ becomes an angle around 0(radian). As a result, $\sin\eta'$ may be replaced by $\eta'$, that is;

$$YD'=BV-\{Bu\times(\beta-\eta')\} \quad (5)$$

$$PD'=Bu+\{BV\times(\alpha+\eta')\} \quad (6)$$

Since the $\eta$ is an angle between the pitching compensation axis PP and the yawing compensation axis YP, the $\eta$ is determined with the mechanical right angle accuracy of the compensation driving section of the compensation optical system 2. A mechanical angle accuracy can be normally determined very accurately in comparison with that of the direction of the detection axis of the angular velocity sensor which is explained before. Consequently, the $\eta'$ is a very small angle in comparison with the $\alpha$ or $\beta$. As a result, $\eta=\pi/2$(radian) and $\eta'=0$(radian) can be assumed.

The following more simplified expressions can be obtained based on these relations.

$$YD''=BV-(Bu\times\beta) \quad (7)$$

$$PD''=Bu+(BV\times\alpha) \quad (8)$$

As described above, the expressions to obtain the reduced driving amounts YD and PD have been established. However each coefficient of angles $\alpha$, $\beta$, $\zeta$, and $\eta$ is needed to obtain the reduced driving amount with these expressions. Since the values of these coefficients are fixed on a structure of a camera, respectively, the values can be obtained at manufacturing of the camera and then stored in the memory section 150 in advance.

Examples of procedures to obtain the coefficients of the angles will be explained hereinunder.

First of all to simplify, it is assumed that the yawing compensation axis YP coincides with the true yawing axis TY and the pitching compensation axis PP coincides with the pitching axis TP. As described before, since the pitching compensation axis PP and the yawing compensation axis YP are fixed on the mechanical structure of the compensation driving section of the compensation optical system 2, the above-mentioned coincidence condition is fulfilled in most cases. In these cases, since the expressions (7) and (8) can be used, coefficients to be obtain are only the $\alpha$ and the $\beta$.

Figure 8A:
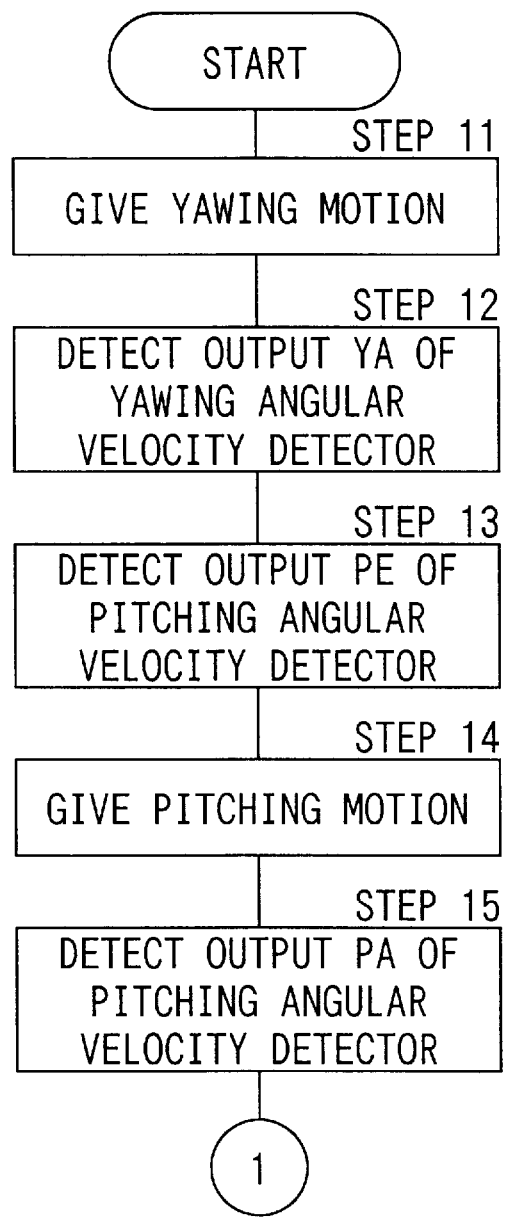

FIG. 8A and FIG. 8B show procedures to obtain the coefficients in case that the above mentioned coincidence condition is fulfilled.

At the step 11, a yawing motion with a certain amount, that is a rotary motion around the true yawing axis (=the yawing compensation axis), is given to a camera first. At the step 12, the output YA of the yawing angular velocity detector 19 is detected to confirm (or adjust) the output level for the yawing motion. At this step the angle $\beta$ between the yawing compensation axis and the yawing detection axis has not been known yet. However, since the expression (1) and the angle condition of the $\beta$ (where the value is around 0 (radian)) are fulfilled, it can be done at this step that the output level of the yawing angular velocity detector 19 is confirmed. If an output level for a certain rotary motion around the detection axis has been adjusted or guaranteed on the angular velocity detector itself and the value of the YA is obvious, this step can be omitted. At the step 13, the output PE of the pitching angular velocity detector 18 is detected. Since the yawing motion at the step 11 is a rotary motion around the true yawing axis, this output PE is in proportion to the inclination of the pitching detection axis u from the true pitching axis TP.

At the next step 14, a predetermined amount of a pitching motion, that is a rotary motion around the true pitching axis (=the pitching compensation axis), is given to the camera. The amount of the motion is predetermined to be the same as one at the step 11. At the step 15, the output PA of the pitching angular velocity detector 18 is detected to confirm (or adjust) the output level for the pitching motion. At the next step 16, the output YE of the yawing angular velocity detector 19 (which is in proportion to the inclination of the yawing detection axis V from the true yawing axis TY) is detected. Since the pitching motion at the step 14 is a rotary motion around the true pitching axis, this output YE is in proportion to the inclination of the yawing detection axis V from the true yawing axis TY.

At the step 17, the coefficient $\alpha$ of the angle a between the pitching detection axis U and the pitching compensation axis PP is calculated. In other words, the a is obtained through the following expression using the output PE detected at the step 13 and the output PA detected at the step 15.

$$\alpha=-(PE/PA) \quad (9)$$

At the step 18, the coefficient $\alpha$ is stored into the memory section 150 in the camera.

At the next step, the angle $\beta$ between the yawing detection axis V and the yawing compensation axis YP is obtained through the following expression.

$$\beta = YE/YA \tag{10}$$

At the step 20, the coefficient β is stored into the memory section 150 in the camera.

The coefficients α and β to obtain the reduced driving amount are stored into the camera through the above-mentioned procedure in FIG. 8. Accordingly, it comes to be possible that the accurate reduced driving amount can be calculated in the arithmetic control section 110 using the expressions (7) and (8) when photography is actually done. The method of this calculation will be explained later in detail.

The form of each coefficient to be stored into the memory section 150 in the camera is not limited to the above-mentioned form. For example, it may be acceptable to store the values of the above mentioned PE, PA, YE and YA in the camera, so that the calculation corresponding to the expressions (9) and (10) is done in the arithmetic control section 110, and then to generate the coefficients α and β. And of course, it may also be acceptable to provide a configuration where a voltage corresponding to each of the coefficients α and β is generated from an analog operation circuit setting a certain value of resistance corresponding to each of the α and β.

In the foregoing, the explanation has been made that the yawing compensation axis YP and the pitching compensation axis PP agree with the true yawing axis and the true pitching axis, respectively. A countermeasure for the case that the former disagrees with the later will be explained in the following. It can be considered that an error in a dimension regarding the installation of the compensation driving section of the compensation optical system 2 into the camera body 1, or the like causes the disagreement noted-above.

First, with the case that the angle between the yawing compensation axis YP and the pitching compensation axis PP are right, explanation will be made with reference to FIG. 9A and FIG. 9B.

Figure 9B:
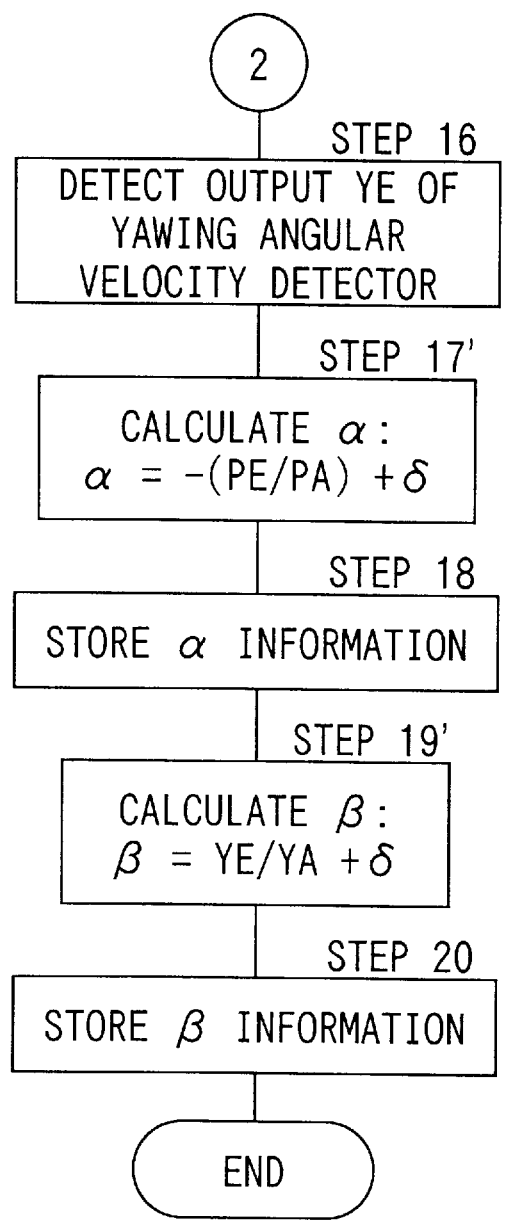

The procedure in FIGS. 9A and 9B is basically the same as the step 11 through the step 20 explained in FIGS. 8A and 8B. Since the expressions (7) and (8) can be also used in this case, coefficients to be obtained are only the α and the β. However, the method to calculate the α and the β is different from one in FIGS. 8A and 8B. That is, when the yawing compensation axis YP and the pitching compensation axis PP disagree with the true yawing axis TY and the true pitching axis TP, respectively, the yawing motion at the step 11 is not exactly a rotary motion around the yawing compensation axis and the pitching motion at the step 14 is not exactly a rotary motion around the pitching compensation axis. Consequently, the α and the β which have been obtained in FIG. 8 is further compensated by following expressions using the angle δ (radian) between the true yawing axis TY and the yawing compensation axis YP shown in FIG. 7. (Although the angle δy is shown in the Figure, but the δ can represent it, because the δp between the true pitching axis TP and the pitching compensation axis PP is the same as the δy.)

$$\alpha = -(PE/PA) + \delta \tag{}$$

$$\beta = (YE/YA) + \delta \tag{}$$

These are processes to be executed at the steps 17' and 19' in FIG. 9B.

If the angle δ is caused by, for example, an dimensional error of a mounting portion which belongs to the compensation driving section of the compensation optical system 2 or a dimensional error of a mounting portion of the side of the camera body 1, it can be previously known by measuring the mechanical dimensions of the parts or the like. And if the δ is unknown, it may be acceptable to perform a simulation of yawing compensation driving in which the compensation optical system 2 is simulatively driven by the driving board for yawing compensation 5. That is, since a direction perpendicular to the driving direction of the compensation optical system 2 is a direction of the yawing compensation axis, the above-mentioned δ can be obtained by detecting the driving direction of the compensation optical system 2. In order to specify the direction of the simulated yawing compensation driving, for example, it may be acceptable to get a light flux into the compensation optical system 2 and then detect a moving direction of an image formation point by a photoelectric device such as a position sensor device or the like.

In the above-mentioned method, although the α, the β and the δ are used with adding each other, the linearity can be kept because they are angles close to 0 (radian).

Next, with the case that the yawing compensation axis YP and the pitching compensation axis PP disagree with the true yawing axis TY and the true pitching axis PP, and the angle between the yawing compensation axis YP and the pitching compensation axis PP are not right, explanation will be made with reference to FIGS. 10A and 10B.

In this case, since the η'=0 (radian) does not fulfilled, no expressions (7) and (8) can be used and the reduced driving amount is calculated using the expressions (5) and (6). Consequently, the above-mentioned η' is required to be included in coefficients to be obtained together with the α and the β.

Figure 10A:
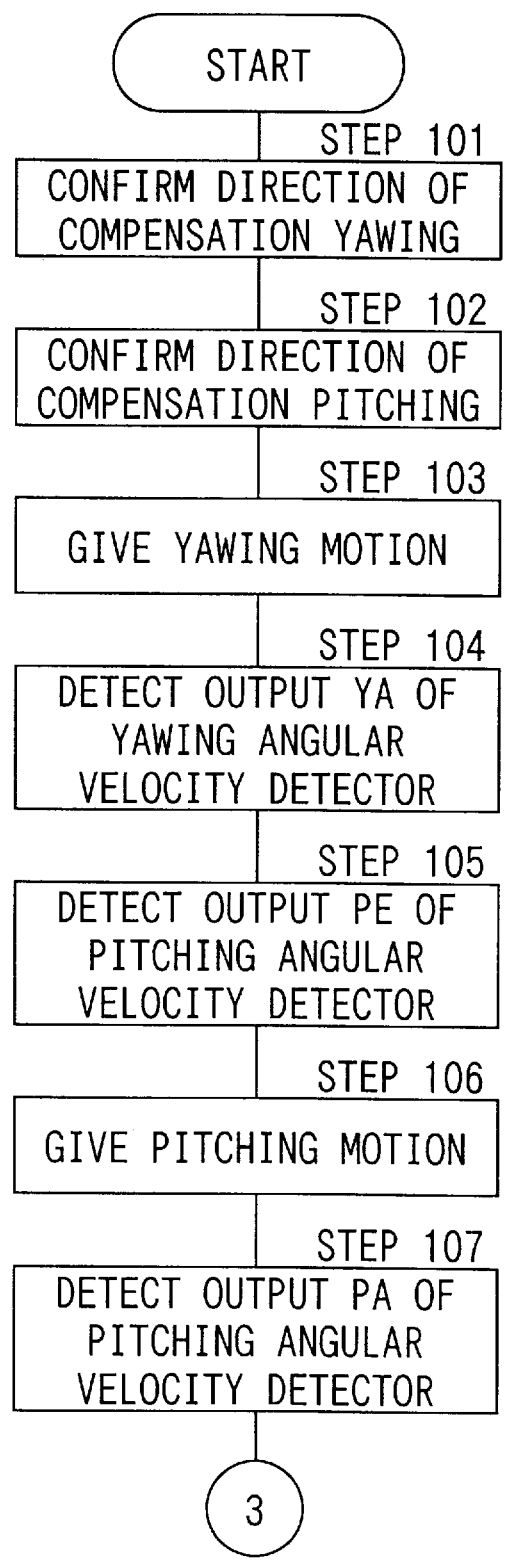

In FIGS. 10A and 10B, a direction of the yawing compensation axis is confirmed at the step 101 first. For example, if the angle δy between the true yawing axis TY and the yawing compensation axis YP or the angle δp between the true pitching axis TP and the pitching compensation axis PP is previously known in the same way as the angle δ explained before, the δy can be used as it is. Consequently, this step can be omitted. And if the δy is unknown, it may be acceptable to perform a simulated yawing compensation driving in which the compensation optical system 2 is simulatively driven by the driving board for yawing compensation 5. Since a direction perpendicular to the yawing driving direction of the compensation optical system 2 is a direction of the yawing compensation axis, the above-mentioned δy can be obtained by detecting the driving direction of the compensation optical system 2.

At the step 102, a direction of compensation pitching is confirmed in the same way. In this case, if the δp between the true pitching axis TP and the pitching compensation axis PP is previously known, this step can be omitted.

The explanation of the steps 103 through 108 will be omitted because they are the same as the steps 11 through 16 explained in FIGS. 8A and 8B, and FIGS. 9A and 9B. The α and the β are obtained by the following expressions at the steps 109 and 111 corresponding to the steps 17 and 19 in FIG. 8B.

$$= -(PE/PA) + \delta p \tag{11}$$

$$= (YE/YA) + \delta y \tag{12}$$

The α and the β are stored in the memory section 150 of the camera at the steps 110 and 112. The η' is obtained by the following expression at the step 113.

$$\eta' = \delta y - \delta p \tag{13}$$

This value is stored in the memory section 150 of the camera at the step 114.

According to the above-mentioned procedure, even if the yawing compensation axis YP and the pitching compensation axis PP are not perpendicular to each other, the proper reduced driving amount can be calculated based on the outputs of the pitching angular velocity detector 18 and the yawing angular velocity detector 19.

Since the expressions (5) and (6), and (11) through (13) can be combined as follows;

$$YD'=BV-[Bu\times\{(YE/YA)+\delta p\}]$$

$$PD'=Bu+[BV\times\{-(PE/PA)+\delta y\}],$$

it may be acceptable to store the coefficients YE/YA (or YE and YA individually), δp, PE/PA (or PE and PA individually) and δy in the memory section 150, and then to retrieve these coefficients into the arithmetic control section 110 when calculating. In this method although the $\alpha$, the $\beta$, the $\delta$, the p, the δy and the $\eta'$ are used with adding each other, the linearity can be kept because they are angles close to 0 (radian).

Since no expressions (5) and (6) are established in case that the above-mentioned $\alpha$, $\beta$ or $\eta'$ is not close to 0 (radian), there is no choice but to calculate the reduced driving amount using the expressions (3) and (4). In this case, coefficients to be required are the $\alpha$, the $\beta$, the $\eta$ and the $\zeta$, and since the $\zeta$ can be calculated by the $\zeta=\eta+\alpha-\beta$ as described before, the $\zeta$ can be generated by calculating in the arithmetic control section 110 of the camera when it is required. Consequently, coefficients to be required are the $\alpha$, the βand the $\eta$. This case will be explained with reference to FIGS. 11A and 11B in the following.

Figure 11A:
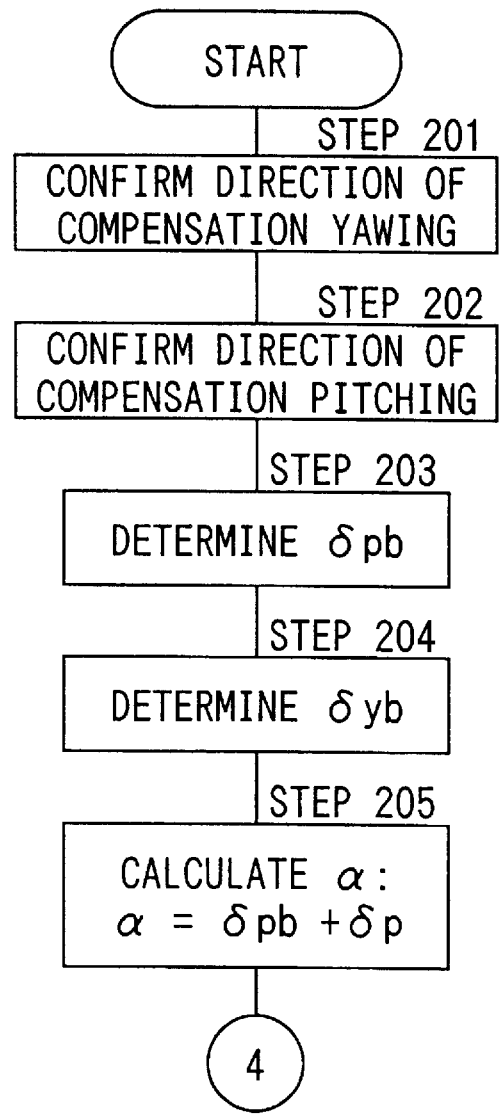
FIG. 11A and FIG. 11B are figures in the same manner as FIG. 8A and FIG. 8B.
Figure 11B:
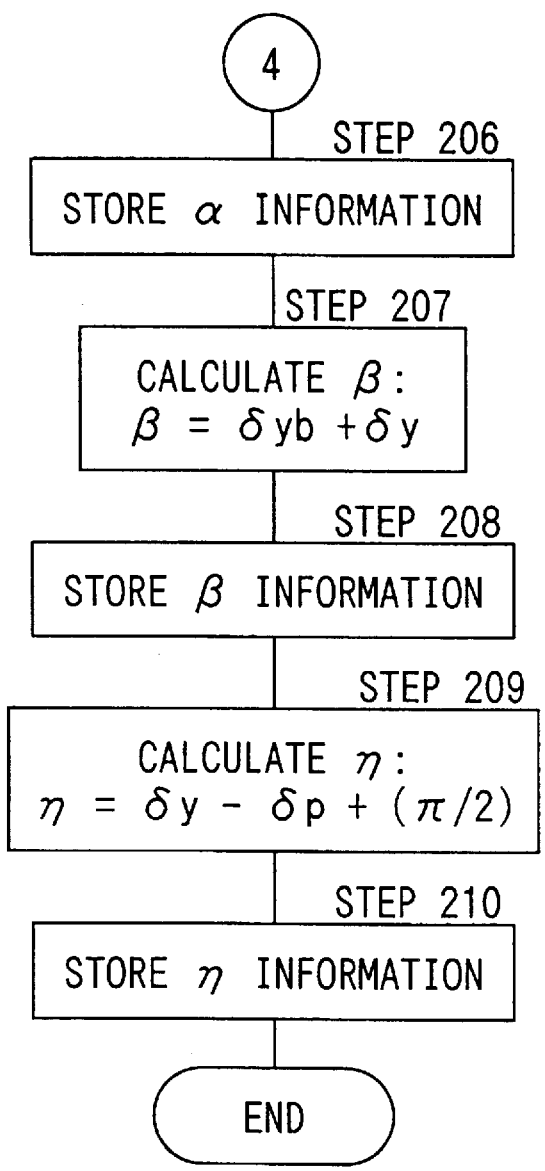

In FIGS. 11A and 11B, the angle δy between the true yawing axis TY and the yawing compensation axis YP and the angle δp between the true pitching axis TP and the pitching compensation axis PP are determined at the steps 201 and 202 in the same way as the steps 101 and 102 in FIG. 10A. At the step 203 the angle δpb (radian) between the pitching detection axis u and the true pitching axis TP shown in the FIG. 7 is determined. That is, since no expression (9) explained before in FIGS. 8A and 8B is established in case that the $\alpha$ is not close to 0 (radian) as described above, the δp and the δpb are obtained to obtain the $\alpha$. For example a following procedure is possible to determine the δpb. Namely, while a rotary motion around the yawing axis is given to the camera body 1, the output PE of the pitching angular velocity detector 18 is detected, and the rotation axis direction of the rotary motion given to the camera is changed until the output PE becomes 0. When the output PE of the pitching angular velocity detector 18 becomes 0, a direction perpendicular to the rotation axis direction is a direction of the pitching detection axis u. The angle between this direction and the true pitching axis TP is detected and the angle thus detected is set to be the δpb.

When the angle δpb is previously known based on an accuracy of the pitching angular velocity detector 18 itself in the axis direction, an accuracy of installing it on the board 17 and then the camera body 1, or the structural characteristics, the step 203 can be omitted.

At the step 204, the angle δyb between the yawing detection axis V and the true yawing axis TY is determined. The method to determine it is the same as the step 203. At the step 205, the angle $\alpha$ between the pitching detection axis u and the pitching compensation axis PP is obtained by the following expression.

$$\alpha=\delta pb+\delta p$$

At the step 206, the a is stored in the memory section 150 in the camera.

At the step 207, the angle $\beta$ between yawing detection axis V and the yawing compensation axis YP is obtained by the following expression.

$$\delta=yb+\delta y$$

At the step 208, the $\beta$ is stored in the memory section 150 in the camera.

At the step 209, the $\eta$ is obtained by the following expression.

$$\eta=\delta y-\delta p+(\pi/2)$$

At the step 210, the $\eta$ is stored in the memory section 150 in the camera.

An alternating rotary motion is preferable for the yawing motion and the pitching motion which are given to the camera in FIGS. 8A through 11B in the same way as the rolling motion explained before. The reason thereof is the same as described before.

Figure 12:
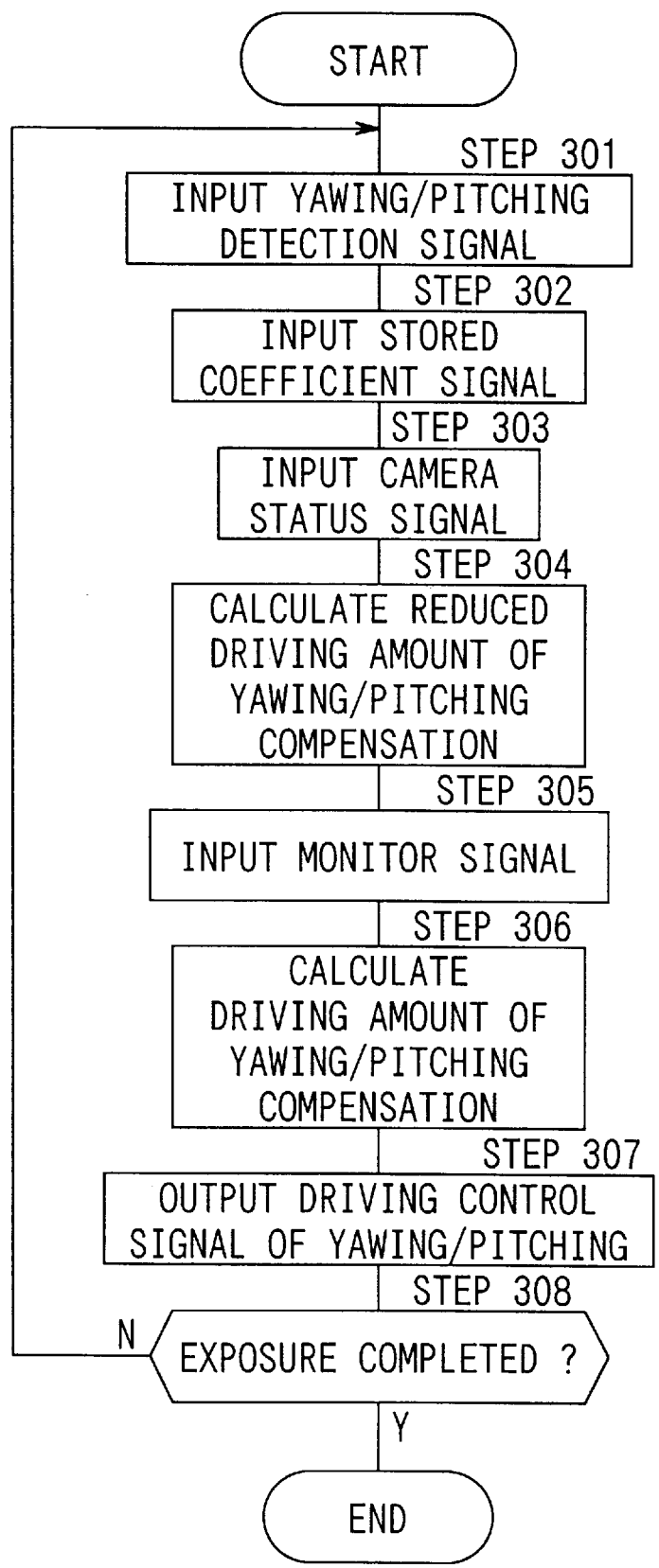
FIG. 12 is a flowchart which shows a procedure of an image vibration prevention on an camera.

FIG. 12 shows a flowchart which explains a procedure for a compensation control of image vibration in the arithmetic control section 110.

This program is started when an exposure has been started. At the step 301, the output signals of the pitching angular velocity detector 18 and the yawing angular velocity detector 19 are input. At the step 302, the coefficients stored in the memory section 150 are read out. At the step 303, information detected by the camera status detecting section 140, for example a focal distance of a photographic lens, a camera-to-subject distance and the like, is input. At the step 304, the output signals of the angular velocity detectors 18 and 19 and the value of each coefficient are substituted in the above-mentioned expressions, and then the reduced driving amount which forms the basis of calculating driving amounts of pitching compensation and yawing compensation is calculated. In concrete terms, for example, when the both angles between the detection axis u and the compensation axis PP and between the detection axis V and the compensation axis YP are close to 0 (radian), and also the yawing compensation axis YP and the pitching compensation axis PP are perpendicular to each other, the reduced driving amounts YD" and PD" are calculated by substituting the outputs of the angular velocity detectors 18 and 19 and the coefficients $\alpha$ and $\beta$ in the expressions (7) and (8). When the yawing compensation axis YP and the pitching compensation axis PP are not perpendicular to each other, the reduced driving amounts YD' and PD' are calculated by substituting the outputs of the angular velocity detectors 18 and 19 and the coefficients $\alpha$, $\beta$ and $\eta'$ in the expressions (5) and (6). Further, when the both angles between the detection axis u and the compensation axis PP and between the detection axis V and the compensation axis YP are not close to 0 (radian), the reduced driving amounts YD and PD are calculated by substituting the coefficients $\alpha$, $\beta$, $\eta$ and $\zeta$ in the expressions (3) and (4).

At the step 305, a driving amount of the compensation optical system 2, that is a signal regarding the current location of the compensation optical system, is input from the monitor section 130. At the step 306, the driving amount of pitching compensation and the driving amount of yawing compensation of the compensation optical system 2 are calculated based on the reduced driving amount in each direction calculated at the step 304, information of camera status (for example, a focal distance of a photographic lens, a camera-to-subject distance and the like) and information of the monitor signal. Since the proper moving amount of the compensation optical system slightly varies according to the information of these focal distance of the photographic lens and camera-to-subject distance, the focal distance and the photographic distance are considered here.

At the step 307, the driving signals obtained based on each compensation driving amount at the step 306 are output to the compensation driving section 120. The pitching driving motor 10 and the yawing driving motor 11 which compose the compensation driving section 120 are driven based on these signals, and then the compensation optical system 2 is driven with a proper amount through the pitching compensation board 4 and the yawing compensation board 5. As a result, the compensation optical system 2 is moved based on the driving amount and the driving direction which are composed of the compensation driving amount in yawing direction and the compensation driving amount in pitching direction so as to prevent the image vibration. At the step 308, a decision is made as to whether or not the exposure has been finished. If the exposure has not been finished yet, then the flow of control returns back to the step 301, and the above described process will be repeated. If the exposure has been finished, then the flow of control finishes the process.

The kinds of coefficients which are stored in the memory section 150 are not restricted to only $\alpha$, $\beta$, $\delta$, $\delta p$, $\delta y$, $\delta pb$, $\delta yb$, $\eta$ and $\eta$, or PE, PA, YE and YA. It may be acceptable to use a coefficient or coefficients (for example $\zeta$) which is defined by a relationship between each direction of detection axis and each direction of compensation axis.

Figure 14:
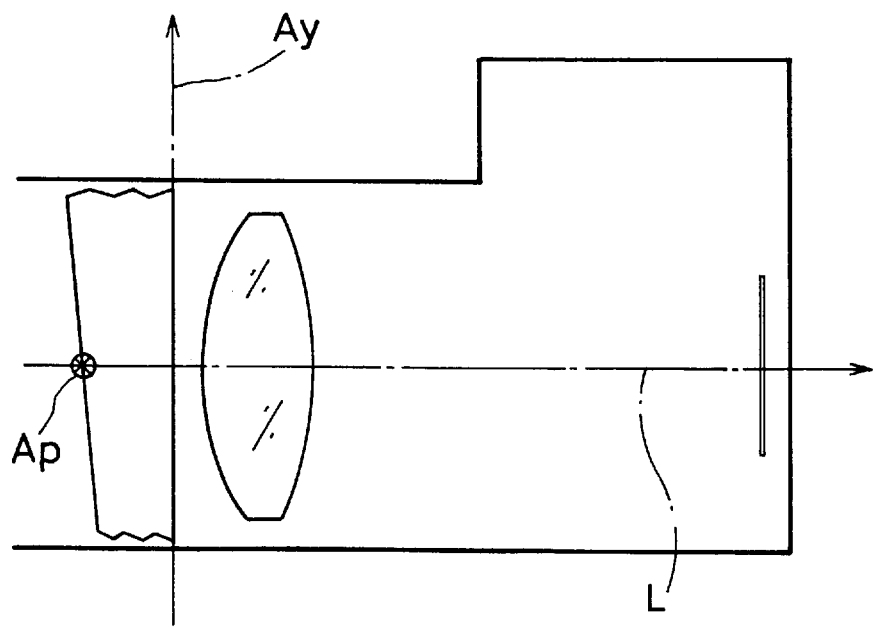
FIG. 14 is a figure which shows a variation of a compensation optical system.
Figure 15:
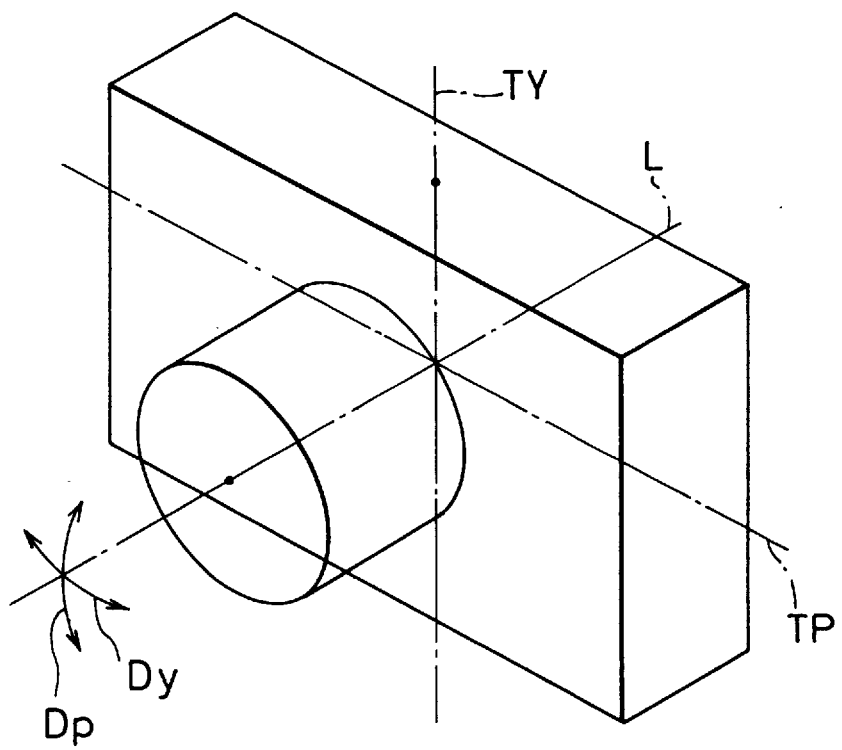
FIG. 15 is a figure which explains directions of camera vibration.

A configuration of the compensation optical system is not restricted to the above-mentioned one, and for example a variable vertical angle prism 51 shown in FIG. 14 may also be available. A boundary surface 51a of this variable angle prism 51 can be inclined in both the first driving direction (a rotating direction around the pitching compensation axis Ap) and the second driving direction (a rotating direction around the yawing compensation axis Ay) against a plane perpendicular to the optical axis L of the photographic optical system so as to adjust an image formation point of light transmitted through the photographic optical system on a photographic screen.

Further, there has been known a device which moves an imaging element up and down, and right and left so as to compensate a blur of the image on the imaging element. The present invention can be also applied to this kind of device. In this case, a driver in the up and down direction is corresponding to the pitching driver and a driver in the right and left direction is corresponding to the yawing driver. Although an example has been exhibited in that the compensation optical system is driven in a direction perpendicular to the compensation axis has been shown above, the direction in which the compensation optical system is driven is not restricted to the direction perpendicular to the compensation axis, and any direction is available if it is defined with the compensation axis. Although a case in which the angular velocity detector is used has been explained above, for example an angular acceleration detector is also available to be used. Further, although the present invention has been explained above on the image vibration prevention apparatus of a still camera, it can be also applied to an image vibration prevention apparatus of a video camera. Further, if a driving apparatus detects a rotary motion around a detection axis and drives an object to be driven based on the detection result, the present invention can be applied to this kinds of driving apparatus in addition to the image vibration prevention apparatus of a camera.

We claim:

1. A driving apparatus for driving an object housed in a main body of said driving apparatus in a direction which is determined by a predetermined reference axis, said driving apparatus comprising:

a detector which detects a physical amount relating to a rotary motion of said main body around a predetermined detection axis;

an arithmetic device which calculates a driving amount of said object based on at least an output of said detector and an angle between said detection axis and said reference axis; and a driving mechanism which drives said object in said direction determined by said reference axis, based on a calculation output from said arithmetic device.

2. A driving apparatus for driving an object in a main body of said driving apparatus in two directions which are determined by predetermined first and second reference axes, respectively, said driving apparatus comprising:

first and second detectors which detect physical amounts relating to rotary motions of said main body around first and second detection axes, respectively;

an arithmetic device which calculates a first driving amount of said object in a first driving direction, said first driving amount based on at least outputs of said first and second detectors and an angle between said first detection axis and said first reference axis, and also calculates a second driving amount of said object in a second driving direction, said second driving amount based on at least outputs of said first and second detectors and an angle between said second axis and said second reference axis; and a driving mechanism which drives said object in said first direction based on said first driving amount and drives said object in said second driving direction based on said second driving amount.

3. A driving apparatus according to claim 2, wherein said first driving direction is a direction perpendicular to said first reference axis and said second driving direction is a direction perpendicular to said second reference axis.

4. A driving apparatus according to claim 2, wherein said first and second detectors comprise angular velocity detectors which detect rotary angular velocities around said first and second detection axes, respectively.

5. A driving apparatus according to claim 2, further comprising:

a memory device in which a first coefficient regarding an angle between said first detection axis and said first reference axis and a second coefficient regarding an angle between said second detection axis and said second reference axis are stored, wherein said arithmetic device calculates said first driving amount of said object based on said outputs of said first and second detectors, and said first coefficient stored in said memory device, and also calculates said second driving amount of said object based on said outputs of said first and second detectors, and said second coefficient stored in said memory device.

6. A driving apparatus according to claim 2, wherein said arithmetic device calculates said first driving amount of said object based on said outputs of said first and second detectors, said angle between said first detection axis and said first reference axis, and an angle between said first and second reference axes, and also calculates said second driving amount of said object based on said outputs of said first and second detectors, said angle between said second detection axis and said second reference axis, and said angle between said first and second reference axes.

7. A driving apparatus according to claim 6, further comprising:
   a memory device in which a first coefficient based on said angle between said first detection axis and said first reference axis, a second coefficient based on said angle between said second detection axis and said second reference axis, and a third coefficient based on said angle between said first and second reference axes are stored,
   wherein said arithmetic device calculates said first driving amount of said object based on said outputs of said first and second detectors, and said first and third coefficients, and also calculates said second driving amount of said object based on said outputs of said first and second detectors, and said second and third coefficients.

8. A driving apparatus according to claim 7, wherein said first driving direction is a direction perpendicular to said first reference axis and said second driving direction is a direction perpendicular to said second reference axis.

9. A driving apparatus according to claim 7, wherein said first and second detectors comprise angular velocity detectors which detect rotary angular velocities around said first and second detection axes, respectively.

10. A driving apparatus according to claim 2, wherein said main body comprises a camera, and
    said object to be driven comprises a compensation optical system which comprises a part of a photographic optical system of said camera and is moved in said first and second driving directions perpendicular to said first and second reference axes respectively to prevent an image vibration.

11. A driving apparatus comprising:
    a first and a second sensors which detect physical amounts relating to rotary motions around a first and a second detection axes which are not parallel to each other, respectively;
    an object to be driven which is driven two-dimensionally in a plane parallel to both said first and second detection axes;
    a memory device in which a first coefficient regarding an angle between said first detection axis and a second driving direction and a second coefficient regarding an angle between said second detection axis and a first driving direction are stored;
    an arithmetic device to calculate a driving amount of said object to be driven in said first driving direction based on outputs of said first and second sensors and said first coefficient, and also calculate a driving amount of said object to be driven in said second driving direction based on said outputs of said first and second sensors and said second coefficient; and
    a driving mechanism which drives said object to be driven based on a driving amount and a driving direction which are composed of said driving amounts in said first and second driving directions calculated above.

12. A driving apparatus according to claim 11, wherein a third coefficient regarding an angle between said first and second driving directions is also stored in said memory device, and
    said arithmetic device calculates said driving amount of said object to be driven in said first driving direction based on said outputs of said first and second sensors and said first and third coefficients, and also calculates said driving amount of said object to be driven in said second driving direction based on said outputs of said first and second sensors and said second and third coefficients.

13. A driving apparatus according to claim 11, wherein a third coefficient regarding an angle between said first and second detection axes is also stored in said memory device, and
    said arithmetic device calculates said driving amount of said object to be driven in said first driving direction based on said outputs of said first and second sensors and said first and third coefficients, and also calculates said driving amount of said object to be driven in said second driving direction based on said outputs of said first and second sensors and said second and third coefficients.

14. A driving apparatus according to claim 11, wherein said first and second sensors comprise angular velocity sensors which detect rotary angular velocities around said first and second detection axes, respectively.

15. A driving apparatus comprising:
    a first and a second sensors which detect physical amounts relating to rotary motions around a first and a second detection axes which are not parallel to each other, respectively;
    an adjusting mechanism which adjusts said first and second sensors in angle to a plane parallel to both a pitching axis and a yawing axis which are perpendicular to each other;
    an object to be driven which is driven in said plane parallel to both said pitching axis and said yawing axis;
    a memory device in which a first coefficient regarding an angle between said first detection axis and said pitching axis and a second coefficient regarding an angle between said second detection axis and said yawing axis are stored;
    an arithmetic device to calculate a driving amount of said object to be driven in a direction of said yawing axis based on outputs of said first and second sensors and said first coefficient, and also calculate a driving amount of said object to be driven in a direction of said pitching axis based on said outputs of said first and second sensors and said second coefficient; and
    a driving mechanism which drives said object to be driven based on a driving amount and a driving direction which are composed of said driving amount in said direction of said yawing axis and said driving amount in said direction of said pitching axis calculated above.

16. A driving apparatus according to claim 15, wherein a third coefficient regarding an angle between said pitching axis and said yawing axis is also stored in said memory device, and
    said arithmetic device calculates a driving amount of said object to be driven in said direction of said yawing axis based on said outputs of said first and second sensors and said first and third coefficients, and also calculates a driving amount of said object to be driven in said direction of said pitching axis based on said outputs of said first and second sensors and said second and third coefficients.

17. A driving apparatus according to claim 15, wherein a third coefficient regarding an angle between said first and second detection axes is also stored in said memory device, and said arithmetic device calculates a driving amount of said object to be driven in said direction of said yawing axis based on said outputs of said first and second sensors and said first and third coefficients, and also calculate a driving amount of said object to be driven in said direction of said pitching axis based on said outputs of said first and second sensors and said second and third coefficients.

18. A driving apparatus according to claim 15, wherein said first and second sensors comprise angular velocity sensors which detect rotary angular velocities around said first and second detection axes, respectively.

19. A camera comprising:
a first and a second sensors which detect physical amounts relating to rotary motions of said camera around a first and a second detection axes which are parallel to a plane perpendicular to an optical axis of a photographic optical system and are not parallel to each other, respectively;
an image formation point adjusting member which adjusts an image formation point of light transmitted through said photographic optical system on an image formation plane;
a memory device in which a first coefficient regarding an angle between said first detection axis and a second driving direction and a second coefficient regarding an angle between said second detection axis and a first driving direction are stored;
an arithmetic device to calculate a driving amount of said image formation point adjusting member in said first driving direction based on outputs of said first and second sensors and said first coefficient, and also calculate a driving amount of said image formation point adjusting member in said second driving direction based on said outputs of said first and second sensors and said second coefficient; and
a driving mechanism which drives said image formation point adjusting member based on a driving amount and a driving direction which are composed of said driving amounts in said first and second driving directions calculated above.

20. A camera according to claim 19, further comprising:
an adjusting mechanism which adjusts said first and second sensors in angle to a plane perpendicular to an optical axis of said photographic optical system.

21. A camera according to claim 19, wherein a third coefficient regarding an angle between said first and second driving directions is also stored in said memory device, and
said arithmetic device calculates a driving amount of said image formation point adjusting member in said first driving direction based on said outputs of said first and second sensors and said first and third coefficients, and also calculates a driving amount of said image formation point adjusting member in said second driving direction based on said outputs of said first and second sensors and said second and third coefficients.

22. A camera according to claim 19, wherein a third coefficient regarding an angle between said first and second detection axes is also stored in said memory device, and
said arithmetic device calculates a driving amount of said image formation point adjusting member in said first driving direction based on said outputs of said first and second sensors and said first and third coefficients, and also calculates a driving amount of said image formation point adjusting member in said second driving direction based on said outputs of said first and second sensors and said second and third coefficients.

23. A camera according to claim 19, wherein said image formation point adjusting member comprises an image vibration compensation optical system which composes a part of said photographic optical system and is moved two-dimensionally in a first and a second driving directions in a plane perpendicular to said optical axis of said photographic optical system to adjust said image formation point of light transmitted through said photographic optical system on said image formation plane.

24. A camera according to claim 19, wherein said image formation point adjusting member comprises a prism having a boundary surface which is inclined to a plane perpendicular to said optical axis of said photographic optical system in a first and a second driving directions to adjust said image formation point of light transmitted through said photographic optical system on said image formation plane.

25. A camera according to claim 19, wherein said first and second sensors comprise angular velocity sensors which detect rotary angular velocities around said first and second detection axes, respectively.

26. A method for controlling and driving an object to be driven, comprising the steps of:
detecting physical amounts relating to rotary motions around a first and a second detection axes, which are not parallel to each other, with a first and a second sensors, respectively;
reading out a first coefficient regarding an angle between said first detection axis and a second driving direction and a second coefficient regarding an angle between said second detection axis and a first driving direction from a memory device;
calculating a driving amount of said object to be driven in said first driving direction based on outputs of said first and second sensors and said first coefficient, and also a driving amount of said object to be driven in said second driving direction based on said outputs of said first and second sensors and said second coefficient; and
driving said object to be driven two-dimensionally in a plane parallel to both said first and second detection axes based on a driving amount and a driving direction which are composed of said driving amounts in said first and second driving directions calculated above.

27. A method for storing coefficients, comprising the steps of:
causing a first rotary motion around a first driving direction to a main body having a first sensor which detects a physical amount relating to a rotary motion around a first detection axis, a second sensor which detects a physical amount relating to a rotary motion around a second detection axis, and an object to be driven in said first driving direction and a second driving direction which are different from each other;
storing outputs of said first and second sensors which are obtained in said first rotary motion, or a first coefficient relating to an angle between said first detection axis and said second driving direction which is obtained based on said outputs in a memory;
causing a second rotary motion around said second driving direction to said main body; and
storing said outputs of said first and second sensors which are obtained in said second rotary motion, or a second coefficient relating to an angle between said second detection axis and said first driving direction which is obtained based on said outputs in said memory.

28. A method for storing coefficients according to claim 27, wherein said first and second rotary motions comprise alternating rotary motions.

29. A method for storing coefficients, comprising the steps of:

causing a third rotary motion around a predetermined rotation axis to a main body having a first sensor which detects a physical amount relating to a rotary motion around a first detection axis, a second sensor which detects a physical amount relating to a rotary motion around a second detection axis which is not parallel to said first detection axis, and an object to be driven in said first driving direction and a second driving direction which are different from each other;

adjusting said first and second sensors in angle to a plane parallel to said predetermined rotation axis in order to let both outputs of said first and second sensors which are obtained in said third rotary motion to almost equal "zero";

causing a first rotary motion around said first driving direction to said main body;

storing outputs of said first and second sensors which are obtained in said first rotary motion, or a first coefficient relating to an angle between said first detection axis and said second driving direction which is obtained based on said outputs in a memory;

causing a second rotary motion around said second driving direction to said main body; and storing said outputs of said first and second sensors which are obtained in said second rotary motion, or a second coefficient relating to an angle between said second detection axis and said first driving direction which is obtained based on said outputs in said memory.

30. A method for storing coefficients according to claim 29, wherein said third rotary motion comprises an alternating rotary motion.

31. A method for storing coefficients according to claim 29, wherein said first and second rotary motions comprise alternating rotary motions.

32. A method for storing coefficients, comprising the steps of:

causing a first rotary motion around a first driving direction to a camera having a first sensor which detects a physical amount relating to a rotary motion around a first detection axis perpendicular to an optical axis of a photographic optical system, a second sensor which detects a physical amount relating to a rotary motion around a second detection axis which is perpendicular to said optical axis of said photographic optical system and not parallel to said first detection axis, and an image vibration compensation optical system which can be driven in said first and a second driving directions which are different from each other, respectively;

storing outputs of said first and second sensors which are obtained in said first rotary motion, or a value relating to an angle between said first detection axis and said second driving direction which is obtained based on said outputs, as a first coefficient to obtain a driving amount of said image vibration compensation optical system in said first driving direction in a memory;

causing a second rotary motion around said second driving direction to said camera; and storing said outputs of said first and second sensors which are obtained in said second rotary motion, or a value relating to an angle between said second detection axis and said first driving direction which is obtained based on said outputs, as a second coefficient to obtain a driving amount of said image vibration compensation optical system in said second driving direction in said memory.

33. A method for storing coefficients according to claim 32, wherein said first and second rotary motions comprise alternating rotary motions.

34. A method for storing coefficients, comprising the steps of:

causing a third rotary motion around an optical axis of a photographic optical system to a camera having a first sensor which detects a physical amount relating to a rotary motion around a first detection axis, a second sensor which detects a physical amount relating to a rotary motion around a second detection axis which is not parallel to said first detection axis, and an image vibration compensation optical system which can be driven in said first driving direction and a second driving direction which are different from each other, respectively;

adjusting said first and second sensors in angle to a plane perpendicular to said optical axis in order to let both outputs of said first and second sensors which are obtained in said third motion to almost equal "zero ";

causing a first rotary motion around said first driving direction to said camera;

storing said outputs of said first and second sensors which are obtained in said first rotary motion, or a first coefficient relating to an angle between said first detection axis and said second driving direction which is obtained based on said outputs in a memory;

causing a second rotary motion around said second driving direction to said camera; and storing said outputs of said first and second sensors which are obtained in said second rotary motion, or a second coefficient relating to an angle between said second detection axis and said first driving direction which is obtained based on said outputs in said memory.

35. A method for storing coefficients according to claim 34, wherein said third rotary motion comprises an alternating rotary motion.

36. A method for storing coefficients according to claim 34, wherein said first and second rotary motions comprise alternating rotary motions.

* * * * *